United States Patent
Mirajkar et al.

(10) Patent No.: US 12,293,114 B2
(45) Date of Patent: May 6, 2025

(54) DIRECT-ATTACHED STORAGE DEVICE SOFTWARE RAID CONTROL COMMUNICATION SYSTEM

(71) Applicant: Dell Products L.P., Round Rock, TX (US)

(72) Inventors: Abhijit Shashikant Mirajkar, Bangalore (IN); Nikhith Ganigarakoppal Kantharaju, Hassan (IN); Ajay Sukumaran Nair Syamala Bai, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 115 days.

(21) Appl. No.: 18/228,028

(22) Filed: Jul. 31, 2023

(65) Prior Publication Data

US 2025/0044996 A1 Feb. 6, 2025

(51) Int. Cl.
*G06F 3/06* (2006.01)
(52) U.S. Cl.
CPC .......... *G06F 3/0689* (2013.01); *G06F 3/0601* (2013.01); *G06F 3/0604* (2013.01); *G06F 3/0664* (2013.01)
(58) Field of Classification Search
CPC .... G06F 3/0689; G06F 3/0601; G06F 3/0604; G06F 3/0664
See application file for complete search history.

(56) References Cited

U.S. PATENT DOCUMENTS

| | | | | |
|---|---|---|---|---|
| 6,470,397 | B1* | 10/2002 | Shah | H04L 67/1097 719/321 |
| 2015/0055562 | A1 | 2/2015 | Shulman et al. | |
| 2017/0269857 | A1* | 9/2017 | Kundu | G06F 3/0689 |
| 2018/0239736 | A1* | 8/2018 | Krishna | G06F 13/4226 |
| 2019/0068493 | A1* | 2/2019 | Ram | H04L 61/2521 |

* cited by examiner

*Primary Examiner* — Sean D Rossiter
(74) *Attorney, Agent, or Firm* — Joseph Mencher

(57) ABSTRACT

A direct-attached storage device software RAID control communication system includes a chassis housing a software RAID subsystem coupled to an operating system and a controller device. The software RAID subsystem provides a virtual adapter device and a virtual miniport driver for the operating system, provides a physical miniport driver for the controller device, and provides a helper driver between the virtual miniport driver and the physical miniport driver. The helper driver identifies, via the physical miniport driver, a communication entry point for the controller device and logical storage subsystem(s) provided by storage device(s) connected to the controller device, and identifies them to the virtual miniport driver. The virtual miniport driver then presents a logical storage device to the operating system that includes at least some of the logical storage subsystem(s), and uses the communication entry point to transmit communications between the operating system and the physical miniport driver.

20 Claims, 22 Drawing Sheets

DIRECT-ATTACHED STORAGE DEVICE SOFTWARE RAID CONTROL COMMUNICATION SYSTEM

CROSS-REFERENCE TO RELATED APPLICATIONS

The present application is related to the following co-pending applications: (1) U.S. patent application Ser. No. 18/228,006, filed Jul. 31, 2023; (2) U.S. patent application Ser. No. 18/228,015, filed Jul. 31, 2023; (3) U.S. patent application Ser. No. 18/228,055, filed Jul. 31, 2023; and (4) U.S. patent application Ser. No. 18/229,293, filed Aug. 2, 2023.

BACKGROUND

The present disclosure relates generally to information handling systems, and more particularly to enabling communications for controlling a direct-attached storage device software RAID provided in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, operating systems in server devices and/or other computing devices known in the art use connected storage devices to store their data, and the protection of such data in the event of the unavailability of any of those storage devices is desirable. An option for protecting data stored on storage devices like those described above includes the utilization of Redundant Array of Independent Disk (RAID) techniques, which one of skill in the art in possession of the present disclosure will recognize is a data storage virtualization technology that combines multiple physical storage devices into one or more logical storage devices for the purposes of data redundancy, performance improvements, and/or other RAID benefits that would be apparent to one of skill in the art in possession of the present disclosure. However, the utilization of RAID techniques on data stored by an operating system in a server device can raise some issues.

For example, the WINDOWS® operating system available from MICROSOFT® Corp. of Redmond, Washington, United States, utilizes a "storage spaces" data protection solution that may be configured to protect data from storage device unavailability discussed above by aggregating storage devices connected to a server/host device via the RAID techniques discussed above, and creating a logical storage device. However, such "storage spaces" data protection solutions do not provide the ability to configure the logical storage device during pre-boot or other initialization operations for the server device, which prevents the installation of the WINDOWS® operating system on that logical storage device. One solution to such issues is the provisioning of a hardware-based RAID data protection solution in the server device that implements hardware-based RAID data protection techniques on data stored in the storage devices in the server device, but such hardware-based RAID data protection solutions are relatively expensive.

Another solution to such issues is the use of a software RAID data protection solution in the server device like that provided in the Virtual RAID on Central Processing Unit (CPU) (VROC) data protection solution available in CPUs provided by INTEL® corporation of Santa Clara, California, United States. However, the VROC data protection solution discussed above is relatively limited in that it is only provided with INTEL® CPUs, may only be utilized with Non-Volatile Memory express (NVMe) storage devices and Serial AT Attachment (SATA) storage devices, only provides RAID1 and RAID5 data protection, and requires Volume Management Device (VMD) hardware in the CPU. As such, the VROC data protection solutions discussed above do not operate with some types of storage devices (e.g., Serial Attached Small Computer System Interface (SCSI) (SAS) storage devices) or some types of CPUs (e.g., CPUs available from Advance Micro Devices (AMD) of Santa Clara, California, United States). Furthermore, the VROC data protection solutions discussed above are also associated with relatively high licensing costs.

Accordingly, it would be desirable to provide a direct-attached storage device software RAID system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a software Redundant Array of Independent Disk (RAID) engine that is configured to: provide a virtual adapter device and a virtual miniport driver for an operating system that is coupled to the processing system; provide a first physical miniport driver for a first controller device that is coupled to the processing system; and provide a first helper driver between the virtual miniport driver and the first physical miniport driver, where the first helper driver is configured to: identify, via the first physical miniport driver, a first communication entry point for the first controller device and at least one first logical storage subsystem provided by at least one first storage device connected to the first controller device; and identify the at least one first logical storage subsystem and the first communication entry point to the virtual miniport driver, wherein the virtual miniport driver is configured to: present, to the operating system, a logical storage device that includes at least some of the at least one first logical storage subsystem; and use the first communication entry point to transmit communications between the operating system and the first physical miniport driver.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
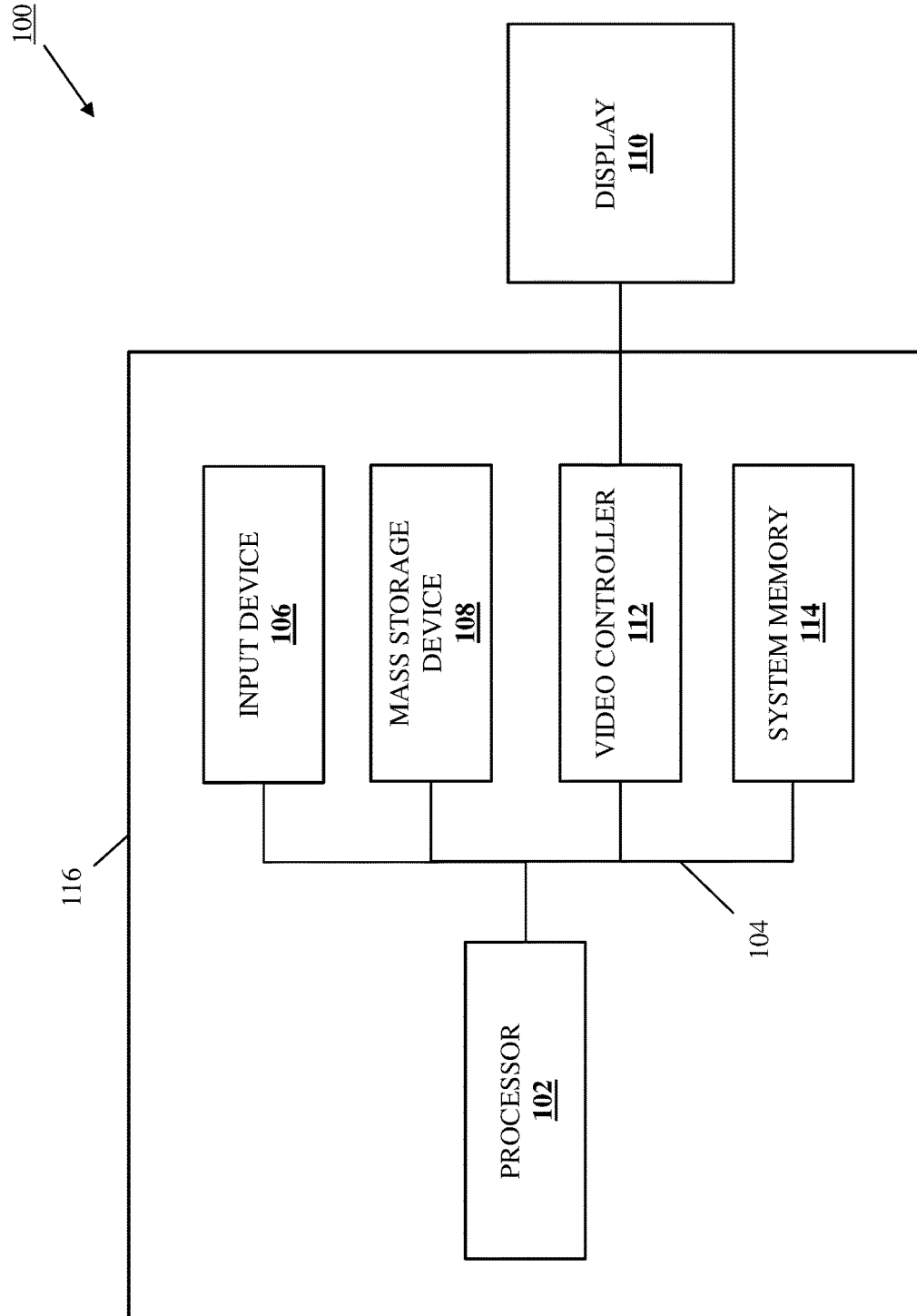
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
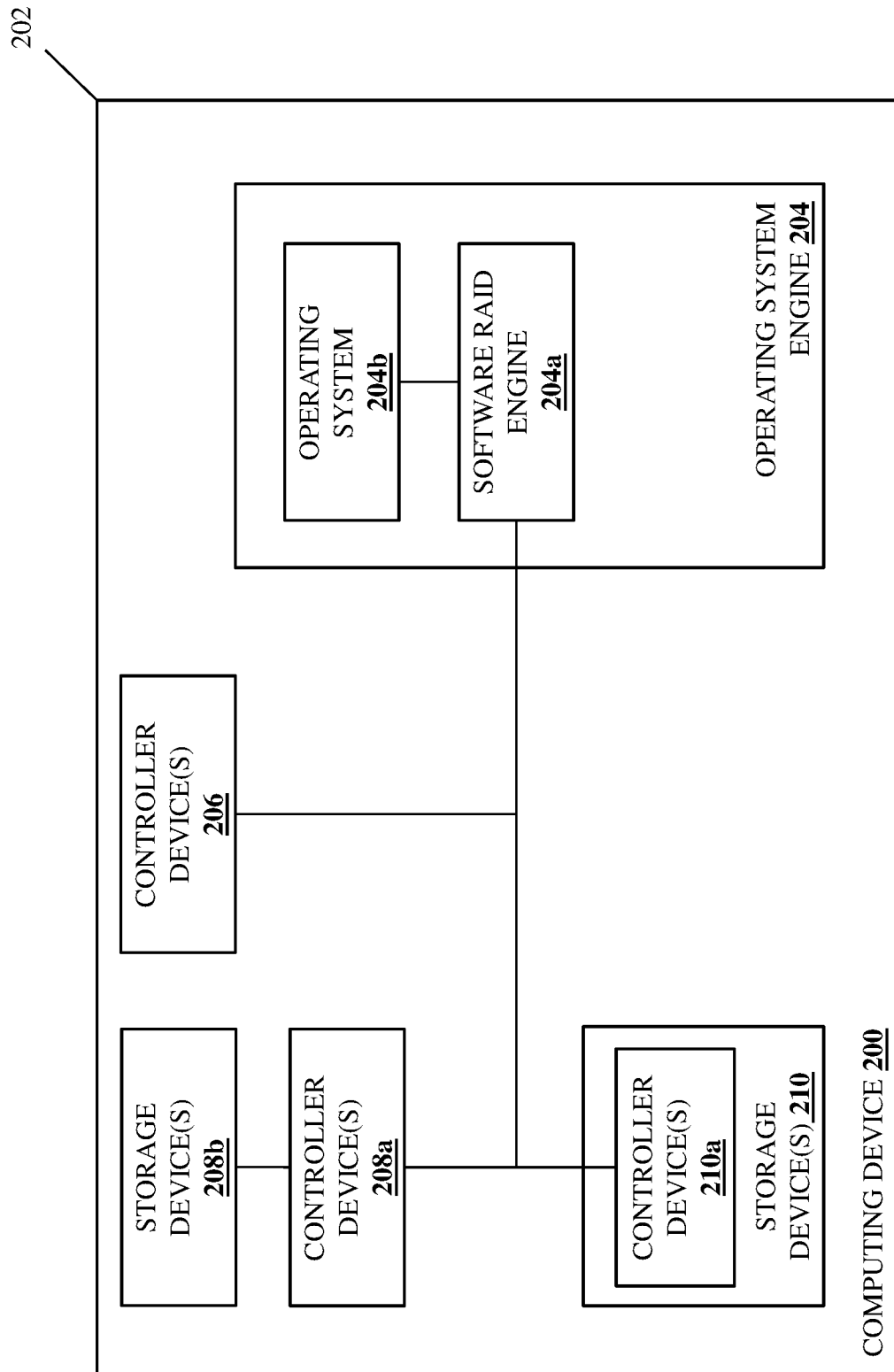
FIG. 2 is a schematic view illustrating an embodiment of a computing device that may include the direct-attached storage device software RAID system of the present disclosure.

Referring now to FIG. 2, an embodiment of a computing device 200 is illustrated that may include the direct-attached storage device software RAID system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses the components of the computing device 200, only some of which are illustrated and described below.

For example, the chassis 202 may house a processing system (not illustrated, but which may include the processor 102 discussed above with reference to FIG. 1 such as a Central Processing Unit (CPU)) and a memory system (not illustrated, but which may include the memory 114 discussed above with reference to FIG. 1 such as Dynamic Random Access Memory (DRAM)) that is coupled to the processing system and that includes instructions that, when executed by the processing system, cause the processing system to provide an operating system engine 204 that is configured to perform the functionality of the operating system engines and/or computing devices discussed below. In the illustrated embodiment, the memory system may also include instructions that, when executed by the processing system, cause the processing system to provide a software RAID engine 204a that is configured to perform the functionality of the software RAID engines, software RAID subsystems, and/or computing devices discussed below.

To provide a specific example, the software RAID engine 204a may include a software RAID driver that is configured to utilize hardware resources in the computing device (e.g., the CPU, memory, etc.) in order to create and manage RAID infrastructure and/or perform any of a variety of RAID operations known in the art without the need for dedicated/specialized RAID hardware (e.g., a dedicated hardware RAID controller). However, while the software RAID engine 204a is illustrated and described as being included in the operating system and/or otherwise being provided by the operating system engine 204 (i.e., being provided by the processing/memory system combination that also provides the operating system engine 204), one of skill in the art in possession of the present disclosure will appreciate how the software RAID engine 204a may be provided separately from the operating system/operating system engine 204 while remaining within the scope of the present disclosure as well.

In an embodiment, the software RAID driver in the software RAID engine 204a will include a Small Computer System Interface (SCSI)-based driver, and one of skill in the art in possession of the present disclosure will appreciate how such a SCSI-compliant driver may be configured to be utilized with any PCIe devices/PCIe controller devices (e.g., Advanced Host Controller Interface (AHCI) controllers, SAS controllers, virtual PCIe controllers, NVMe controllers, etc.), thus allowing a computing device manufacturer to provide a single SCSI-based software RAID driver on a plurality of different computing device configurations of computing devices manufactured by the computing device manufacturer in order to enable the software RAID functionality described below in any of those computing devices using the PCIe devices/PCIe controller devices included in those computing devices. To provide a specific example, the software RAID driver in the software RAID engine 204a may be implemented via the Storport/miniport model used in the WINDOWS® operating system, although other software RAID driver configurations will fall within the scope of the present disclosure as well.

In the illustrated embodiment, the memory system may also include instructions that, when executed by the processing system, cause the processing system to provide an operating system 204b that is configured to use and control the hardware resources in the computing device 200, and/or perform any of the other functionality of the operating systems and/or computing devices discussed below. For example, the operating system 204b may be provided by a WINDOWS® operating system available from MICROSOFT® Corp. of Redmond, Washington, United States, although other operating systems are envisioned as falling within the scope of the present disclosure as well.

In the illustrated embodiment, the chassis 202 also houses one or more controller devices 206 that are coupled to the software RAID engine 204a (e.g., via a coupling between the controller device(s) 206 and the processing system that provides the software RAID engine 204a). As discussed in the specific examples provided below, the controller device(s) 206 may be provided by Peripheral Component Interconnect express (PCIe) controller devices that may be included in and/or coupled to PCIe devices that are not provided by storage devices. For example, the PCIe controller device(s) 206 may be physical or virtual PCIe controller devices and may be included in Host Bus Adapter (HBA) devices, Advanced Host Controller Interface (AHCI) devices, and/or other PCIe devices that would be apparent to one of skill in the art in possession of the present disclosure. However, while illustrated and described as being provided by PCIe controller device(s), one of skill in the art in possession of the present disclosure will appreciate how the controller device(s) 206 may be provided by other types of controller devices while remaining within the scope of the present disclosure as well.

In the illustrated embodiment, the chassis 202 also houses one or more controller devices 208a that are coupled to the software RAID engine 204a (e.g., via a coupling between the controller device(s) 208a and the processing system that provides the software RAID engine 204a). As illustrated and discussed in the specific examples provided below, the controller device(s) 208a may be provided by Peripheral Component Interconnect express (PCIe) storage controller devices that are coupled to one or more storage devices 208b that may be provided by any of Non-Volatile Memory express (NVMe) storage devices, Serial Attached Small Computer System Interface (SCSI) (SAS) storage device, Serial AT Attachment (SATA) storage devices, and/or other storage devices that would be apparent to one of skill in the art in possession of the present disclosure. For example, the PCIe storage controller device(s) 208a may be provided by physical or virtual PCIe storage controller devices and may include PCIe storage controller devices configured as NVMe storage controllers, SAS storage controllers, SATA storage controllers, and/or other PCIe storage controller devices that would be apparent to one of skill in the art in possession of the present disclosure. However, while illustrated and described as being provided by PCIe controller device(s), one of skill in the art in possession of the present disclosure will appreciate how the controller device(s) 208a may be provided by other types of controller devices while remaining within the scope of the present disclosure as well.

In the illustrated embodiment, the chassis 202 also houses one or more controller devices 210a that are coupled to the software RAID engine 204a (e.g., via a coupling between the controller device(s) 208a and the processing system that provides the software RAID engine 204a). As illustrated and discussed in the specific examples provided below, the controller device(s) 210a may be provided by Peripheral Component Interconnect express (PCIe) controller devices that are included in one or more storage devices 210 that may be provided by any of Non-Volatile Memory express (NVMe) storage devices, Serial Attached Small Computer System Interface (SCSI) (SAS) storage device, Serial AT Attachment (SATA) storage devices, and/or other storage devices that would be apparent to one of skill in the art in possession of the present disclosure. For example, the PCIe storage controller device(s) 210a may be provided by physical or virtual PCIe storage controller devices and may include PCIe storage controller devices configured as NVMe storage controllers. However, while illustrated and described as being provided by PCIe controller device(s), one of skill in the art in possession of the present disclosure will appreciate how the controller device(s) 210a may be provided by other types of controller devices while remaining within the scope of the present disclosure as well.

However, while three different embodiments of controller devices 206, 208a, and 210a are illustrated and described as being included in the computing device 200 (e.g., stand-alone controller device(s), storage-device-connected controller device(s), and storage-device-integrated controller device(s)), one of skill in the art in possession of the present disclosure will appreciate how one or more of the controller devices 206, 208a, and/or 210a may be omitted from the computing device 200 while remaining within the scope of the present disclosure as well. Furthermore, while not explicitly illustrated, one of skill in the art in possession of the present disclosure will appreciate how any of the controller devices 208a and/or 210a may be coupled to and/or may control multiple storage devices 208b and/or 210, respectively, while remaining within the scope of the present disclosure as well.

Further still, one of skill in the art in possession of the present disclosure will appreciate how storage devices may be coupled to the software RAID engine 204a via multiple controller devices (e.g., when an NVMe storage device with an integrated controller device is connected via an external controller device to the software RAID engine 204a). As such, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the direct-attached storage device software RAID functionality discussed below, while remaining within the scope of the present disclosure as well.

For example, one of skill in the art in possession of the present disclosure will appreciate how the present disclosure describes the direct-attached storage device software RAID system of the present disclosure implemented to operate with an operating system such as the WINDOWS® operating system described above. However, the inventors of the present disclosure have also developed a direct-attached storage device software RAID system that may be implemented with a hypervisor subsystem in order to allow software RAIDs to be provided using any types of direct-attached storage devices and any types of CPUs in a computing device similarly as described below, and that direct-attached storage device software RAID system is described in U.S. patent application Ser. No. 18/227,914, filed Jul. 29, 2023, the disclosure of which is incorporated herein by reference in its entirety.

Figure 3:
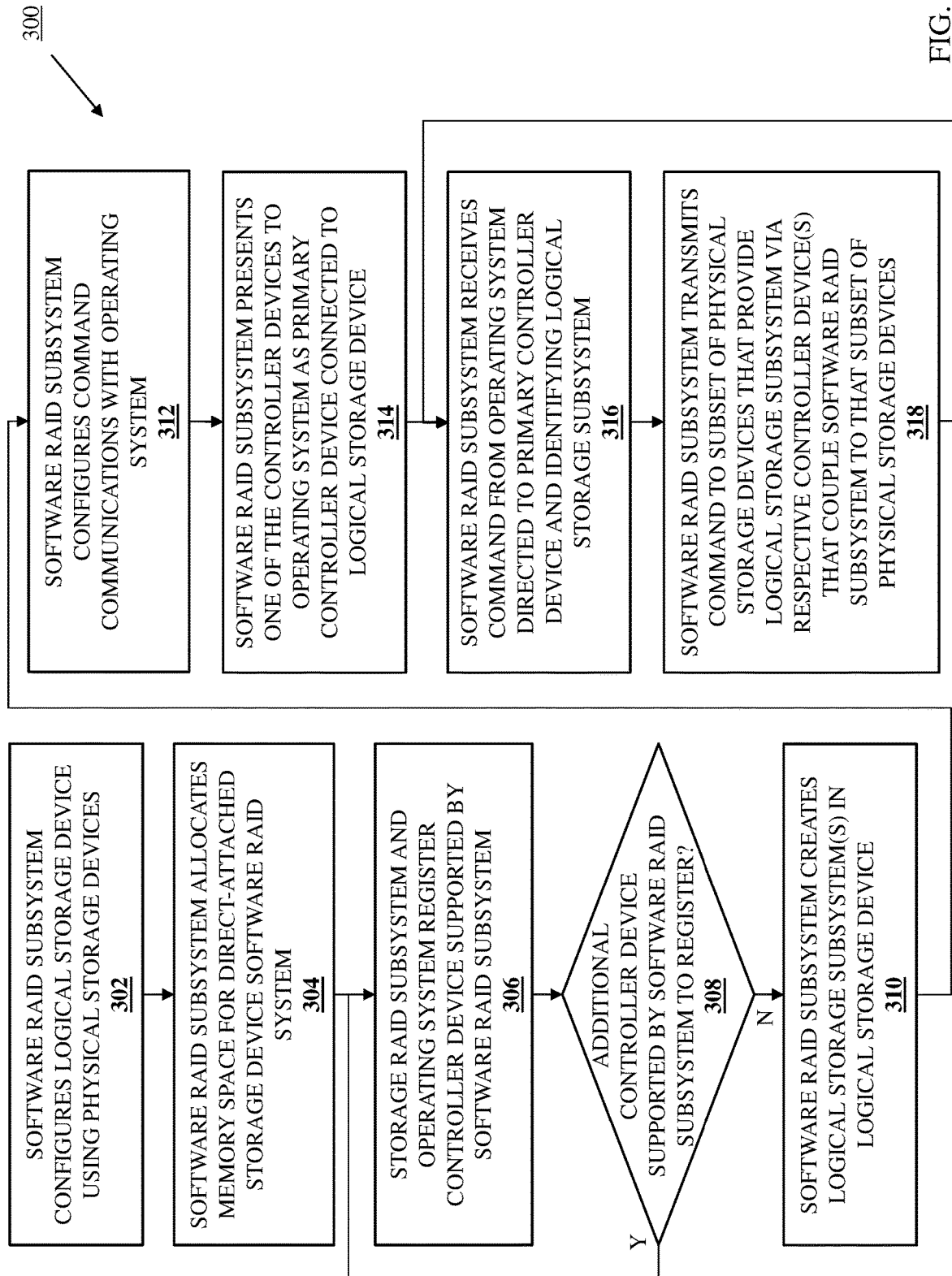
FIG. 3 is a flow chart illustrating an embodiment of a method for providing a software RAID using direct-attached storage devices in a computing device.

Referring now to FIG. 3, an embodiment of a method 300 for providing a software Redundant Array of Independent Disk (RAID) using direct-attached storage devices in a computing device is illustrated. As discussed below, the systems and methods of the present disclosure provide for the presentation by a software RAID subsystem to an operating system of a single, primary controller device as being connected to a logical storage device provided by a plurality of physical storage devices, with the software RAID subsystem receiving commands from the operating system that are directed to the primary controller device and that identify a logical storage subsystem that is included in the logical storage device, and transmitting those commands to a subset of the physical storage devices that provide that logical storage subsystem via respective controller device(s) that couple the software RAID subsystem to that subset of physical storage devices.

For example, the direct-attached storage device software RAID system of the present disclosure may include a chassis housing a software RAID subsystem coupled to physical storage devices, controller devices, and an operating system housed in the chassis. The software RAID subsystem uses the physical storage devices to provide a logical storage device to the operating system. The software RAID subsystem also presents a first controller device to the operating system as a primary controller device that is connected to the logical storage device. When the software RAID subsystem receives a command from the operating system directed to the primary controller device and identifying a logical storage subsystem in the logical storage device, it transmits the command to each of a subset of the physical storage devices that provide the logical storage subsystem in the logical storage device via a respective one of the controller devices that couples the software RAID subsystem to that physical storage device. As such, software RAIDs may be provided using any types of direct-attached storage devices and any types of CPUs in a computing device, as well as provide a variety of other benefits that would be apparent to one of skill in the art in possession of the present disclosure.

Figure 4:
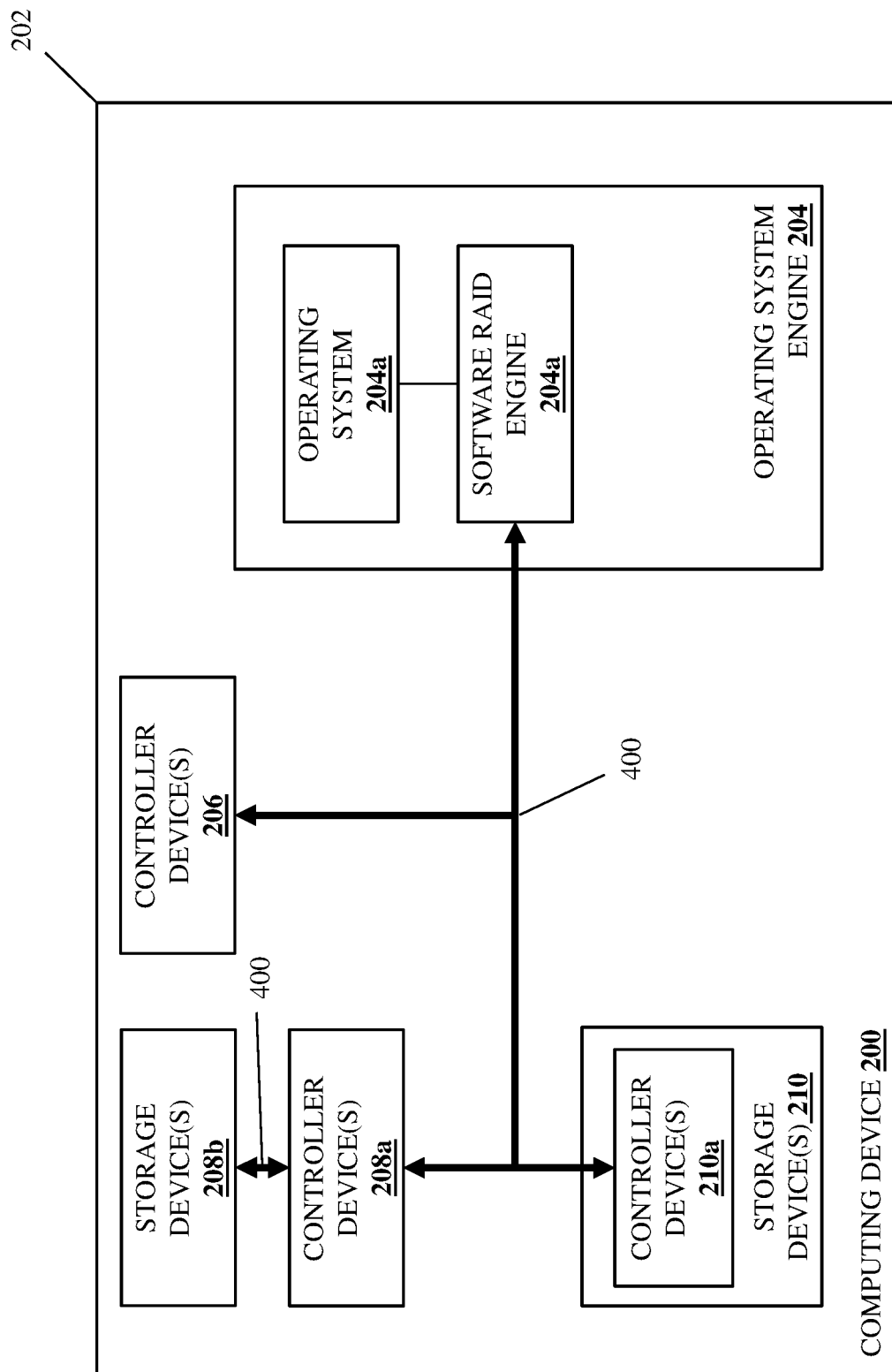
FIG. 4 is a schematic view illustrating an embodiment of the operation of the computing device of FIG. 2 during the method of FIG. 3.

The method 300 begins at block 302 where a software RAID subsystem configures a logical storage device using physical storage devices. With reference to FIG. 4, in an embodiment of block 302, the software RAID engine 204a in the computing device 200 may perform logical storage device configuration operations 400 that may include discovering each of the controller devices 206, 208a, and 210a and, in response, discovering each of the storage devices 208b and/or 210 coupled thereto, and then configuring a logical storage device using those storage devices 208b and/or 210. In a specific example, each of the storage device(s) 208a may be coupled to a PCIe controller device that is provided by one of the controller device(s) 208a discovered at block 302, and each of the storage device(s) 210 may include a PCIe controller device that is provided by one of the controller device(s) 210a discovered at block 302, while PCIe controller device(s) that are provided by the controller device(s) 206 and that are not coupled to storage devices may be discovered at block 302 as well.

For example, in response to the powering on, reset, reboot, and/or other initialization of the computing device 200, the computing device 200 may enter a pre-boot mode in which the software RAID engine 204a performs any of a variety of software RAID operations and/or other techniques that would be apparent to one of skill in the art in possession of the present disclosure in order to configure a RAID using the storage devices 208a and 210 that allows the software RAID engine 204a to present those storage devices 208a and 210 as one or more logical storage devices. As will be appreciated by one of skill in the art in possession of the present disclosure, the RAID maybe configured using the storage devices 208a and 210 with a variety of standard RAID levels such as a RAID0, RAID1, RAID2, RAID3, RAID4, RAID5, or RAID 6, as well as combinations of standard RAID levels (e.g., RAID 1+0, also known as RAID10), non-standard RAID levels, and/or any other RAID levels that would be apparent to one of skill in the art in possession of the present disclosure.

The method 300 then proceeds to block 304 where the software RAID subsystem allocates memory space for a direct-attached storage device software RAID system. In an embodiment, at block 304, the software RAID engine 204a in the computing device 200 may perform memory space allocation operations that may include allocating memory space for use by the direct-attached storage device software RAID system of the present disclosure. For example, the memory space allocation operations performed by the software RAID engine 204a may include allocating a memory space or other portion of the memory system that is used to provide the operating system engine 204 (e.g., operating system kernel memory) for use by the software RAID engine 204a to perform any of the direct-attached storage device software RAID operations or other functionality discussed below. As will be appreciated by one of skill in the art in possession of the present disclosure, the memory space or other portion of the memory system allocated for use by the direct-attached storage device software RAID system may be referred to a "non-cached/non-coherent memory" that may be dynamically allocated during initialization of the computing device 200 to the software RAID driver provided by the software RAID engine 204a (e.g., unlike memory space allocated to stacks), and one of skill in the art in possession of the present disclosure will recognize how the non-cached/non-coherent memory may be utilized to perform any of the functionality described below.

In a specific example, the allocation of the non-cached/non-coherent memory to the software RAID engine 204a may be performed during module initialization operations that are performed when the operating system 204b provided by the operating system engine 204 is loaded and calls those module initialization operations, and the software RAID engine 204a may allocate the non-cached/non-coherent memory based on a number of storage devices (e.g., a maximum number of storage devices) that the software RAID engine 204a is configured to support. However, while a specific example of the allocation of memory space for use by the direct-attached storage device software RAID system of the present disclosure has been described, one of skill in the art in possession of the present disclosure will appreciate how memory space may be allocated for use by the direct-attached storage device software RAID system using a variety of techniques that will fall within the scope of the present disclosure as well.

Figure 5:
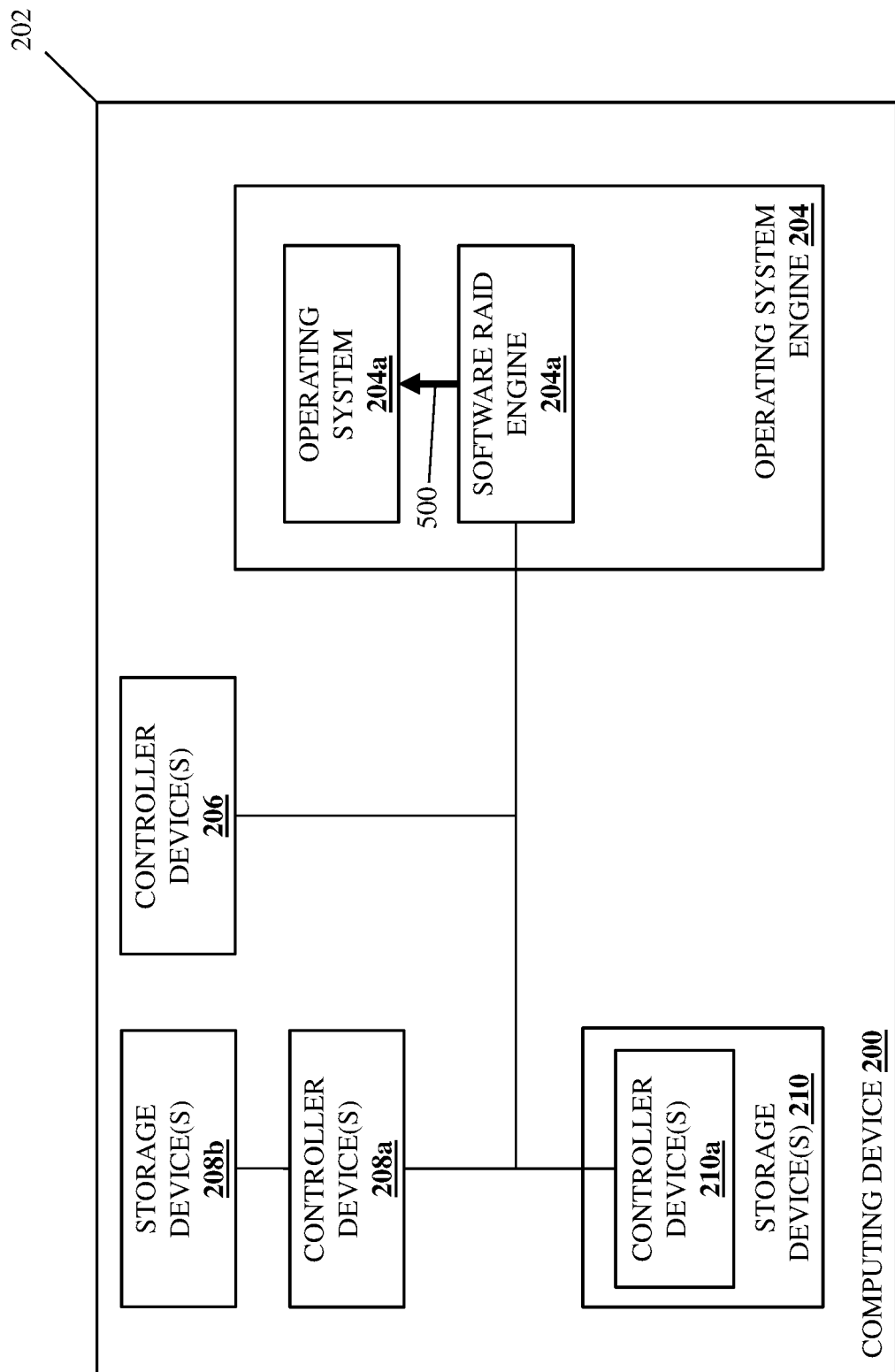
FIG. 5 is a schematic view illustrating an embodiment of the operation of the computing device of FIG. 2 during the method of FIG. 3.

The method 300 then proceeds to block 306 where the software RAID subsystem and the operating system register a controller device supported by the software RAID subsystem. With reference to FIG. 5, in an embodiment of block 306, the controller device registration operations may include the software RAID engine 204a in the computing device 200 performing supported controller device identification operations 500 that may include identifying controller devices that are supported by the software RAID engine 204a to the operating system 204b in the computing device 200 (e.g., using miniport driver commands). For example, any of the controller devices 206, 208a, and/or 210a discovered at block 302 as discussed above may be identified to the operating system 204b as supported controller devices at block 306. In a specific example, at block 306, the software RAID engine 204a may generate a Peripheral Component Interconnect (PCI) IDentification (PCIID) file that identifies the PCIe controller devices that are supported by the software RAID engine 204a, and may load or otherwise transmit that PCIID file to the operating system 204b. However, while a specific example of the identification of controller devices to the operating system 204b that are supported by the software RAID engine 204a has been described, one of skill in the art in possession of the present disclosure will appreciate how the software RAID engine 204a may identify supported controller devices to the operating system 204b using other techniques that will fall within the scope of the present disclosure as well.

Figure 6A:
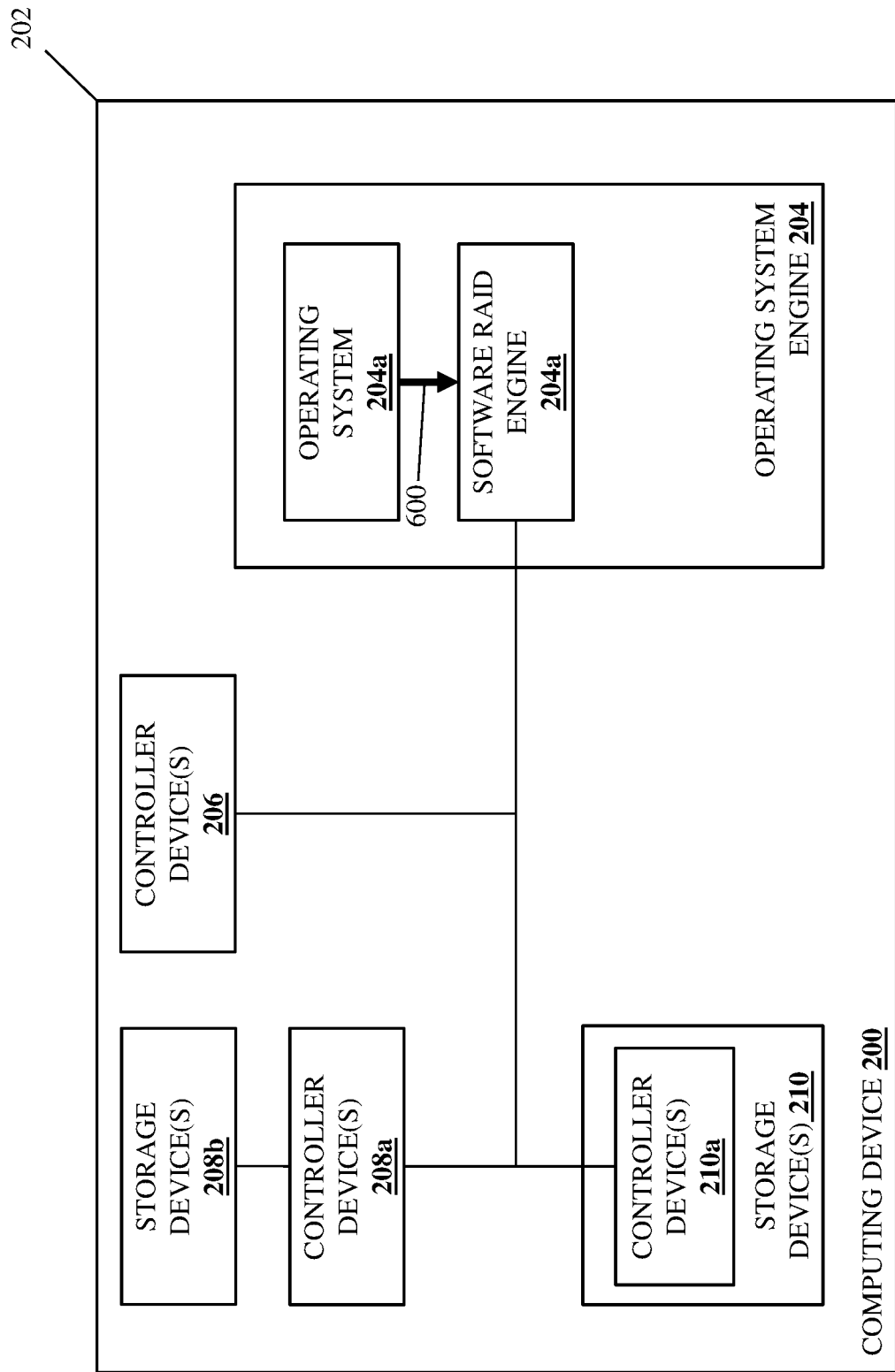
FIG. 6A is a schematic view illustrating an embodiment of the operation of the computing device of FIG. 2 during the method of FIG. 3.

With reference to FIG. 6A, in an embodiment of block 306, the controller device registration operations may also include the operating system 204b in the computing device 200 performing controller device attachment request operations 600 that may include the operating system 204b generating and transmitting a controller device attachment request for one of the controller devices that was identified as being supported by the software RAID engine 204a. For example, the operating system 204b may generate and transmit a "Find Adapter" call that provides the controller device attachment request and that one of skill in the art in possession of the present disclosure will recognize provides an instruction to the software RAID engine to find and attach one of the controller devices that was identified as being supported (e.g., via a Storport layer). However, while a specific example of a controller device attachment request has been described, one of skill in the art in possession of the present disclosure will appreciate how the operating system 204b may request the initialization and discovery of controller devices using other techniques that will fall within the scope of the present disclosure as well.

Figure 6B:
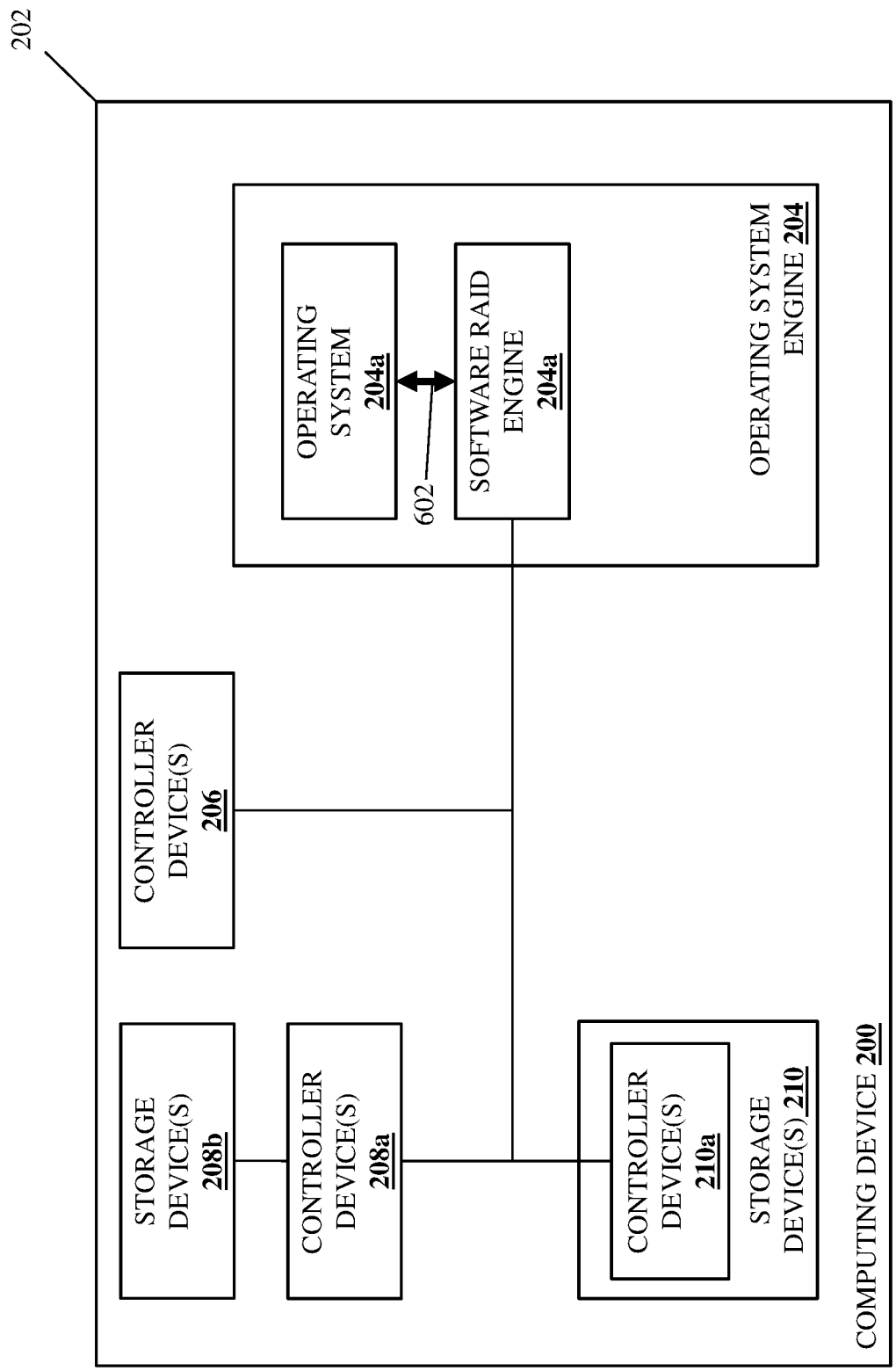
FIG. 6B is a schematic view illustrating an embodiment of the operation of the computing device of FIG. 2 during the method of FIG. 3.

With reference to FIG. 6B, in an embodiment of block 306 and in response to receiving the controller device attachment request (e.g., the "FindAdapter" call), the controller device registration operations may also include the software RAID engine 204a and the operating system 204b in the computing device 200 performing controller device attachment operations 602 that may include the software RAID engine 204a processing the controller device attachment request, attaching a corresponding controller device, and confirming the completion of the controller device attachment request that was received from the operating system 204b. For example, in response to the successful attachment of a connected controller device and its corresponding storage device(s), the software RAID engine 204a may confirm the attachment request to the operating system 204b (e.g., via a "Find Adapter call success" communication transmitted to the operating system 204b). While not illustrated or discussed in detail, one of skill in the art in possession of the present disclosure will appreciate how the software RAID engine 204a may identify to the operating system 204b any failures of the attachment of any connected controller devices and its corresponding storage device(s) as well. In response to receiving the confirmation of the controller device attachment request (e.g., the "Find Adapter call success" communication), the controller device attachment operations 602 may include the operating system 204b generating and transmitting an initialization and discovery request (e.g., a "HwInitialize" call) to the software RAID engine 204a.

Figure 6C:
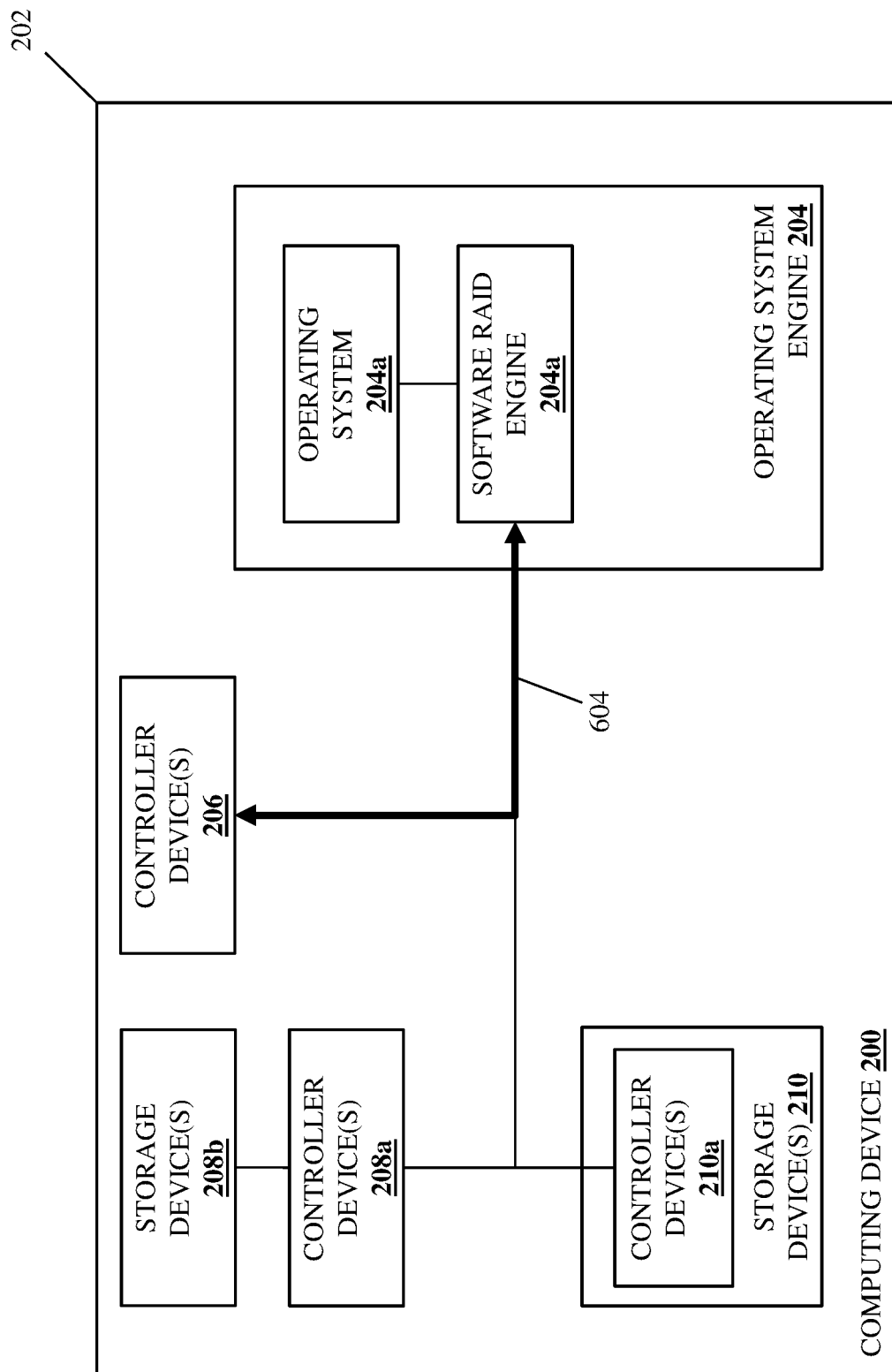
FIG. 6C is a schematic view illustrating an embodiment of the operation of the computing device of FIG. 2 during the method of FIG. 3.

With reference to FIG. 6C, in an embodiment of block 306 and in response to receiving the initialization and discovery request from the operating system 204b, the controller device registration operations may also include the software RAID engine 204a in the computing device 200 performing initialization and discovery operations 604 that may include, in the specific example provided in FIG. 6C, the software RAID engine 204a initializing and discovering the one of the controller device(s) 206 identified by the operating system 204b in the controller device attachment request. As will be appreciated by one of skill in the art in possession of the present disclosure, the initialization and discovery operations 604 performed by the software RAID engine 204a may include any of a variety of initialization operations and discovery operations that would be apparent to one of skill in the art in possession of the present disclosure, that may depend on the protocol supported by that controller device (e.g., a SAS protocol, a SATA protocol, an NVMe protocol, etc.), and that result in the registration of that controller device 206 with the operating system 204b.

In some embodiments, following the initialization and discovery of the first controller device during the first iteration of block 306, the software RAID engine 204a in the computing device 200 may perform timer registration operations that may include registering a timer with the operating system 204b. As discussed below, some embodiments of the present disclosure may include the utilization of a timer to determine when the last controller device has been registered as part of the controller device registration operations performed across one or more iterations of block 306 of the method 300, and thus that timer may be registered by the software RAID engine 204a with the operating system 204b at block 306 using any of a variety of timer registration techniques that would be apparent to one of skill in the art in possession of the present disclosure. However, the registration of the timer is described as occurring at a particular point in method 300 (e.g., following initialization and discovery of the first controller device during the first iteration of block 306), one of skill in the art in possession of the present disclosure will appreciate how the timer may be registered at other points in the method 300 while remaining within the scope of the present disclosure as well. Furthermore, and as discussed in further details below, other embodiments of the method 300 may utilize other techniques to determine when the last controller device has been registered as part of the controller device registration operations across one or more iterations of block 306 of the method 300, and thus the timer registration operations may be skipped in those embodiments.

The method 300 then proceeds to decision block 308 where it is determined whether there is an additional controller device supported by the software RAID subsystem to register. In some embodiments of decision block 308, following the registration of the one of the controller device(s) 206 (in the specific example provided in FIG. 6B) in the operating system 204b at block 306, the software RAID engine 204a in the computing device 200 may perform timer activation operations in order to activate the timer discussed above that may have been registered with the operating system 204b in some embodiments of the present disclosure. The software RAID engine 204a may then monitor that timer at decision block 308 to determine whether another controller device attachment request (e.g., the "FindAdapter" call in the specific example provided above) for another of the controller devices 206, 208b, and/or 210a is received from the operating system 204b within a threshold time period. As will be appreciated by one of skill in the art in possession of the present disclosure, the software RAID engine 204a may utilize any of a variety of threshold time periods that, after which, the software RAID engine 204a may assume that no further controller device attachment requests will be received (i.e., that there are no further controller devices to be registered with the operating system 204b).

However, while the use of a timer and threshold time period following registration of any particular controller device in order to determine whether there are any other controller devices to register at decision block 308 has been described, as discussed above other techniques for determining whether there are any other controller devices to register at decision block 308 will fall within the scope of the present disclosure as well. For example, other embodiments of the present disclosure may provide a software driver in the computing device 200 that is configured to identify a number of available controller devices in the computing device 200, and then transmit that number of available controller devices to the software RAID engine 204a for use in determining at decision block 308 whether the number of controller devices registered with the operating system 204a has reached that number of available controller devices. As such, the determination of whether there are any other controller devices to register in the operating system 204b during decision block 308 of the method 300 may be performed in a variety of manners while remaining within the scope of the present disclosure.

If, at decision block 308, it is determined that there is an additional controller device supported by the software RAID subsystem to register, the method 300 returns to block 306. As such, the method 300 may loop such that the software RAID engine 204a and the operating system 204b in the computing device 200 operate to register any additional controller device with the operating system 204b. Thus, different iterations of block 306 and decision block 308 may cause the software RAID engine 204a and the operating system 204b to register each of the controller devices in the computing device 200 in the operating system 204b. For example, for any remaining controller devices 206, 208a, and 210a, the controller device attachment request operations 600, controller device attachment operations 602, and initialization and discovery operations 604 described above for block 306 may be performed for that controller device, and block 306 may repeat until it is determined that there are no additional controller devices to register with the operating system 204b.

Figure 7:
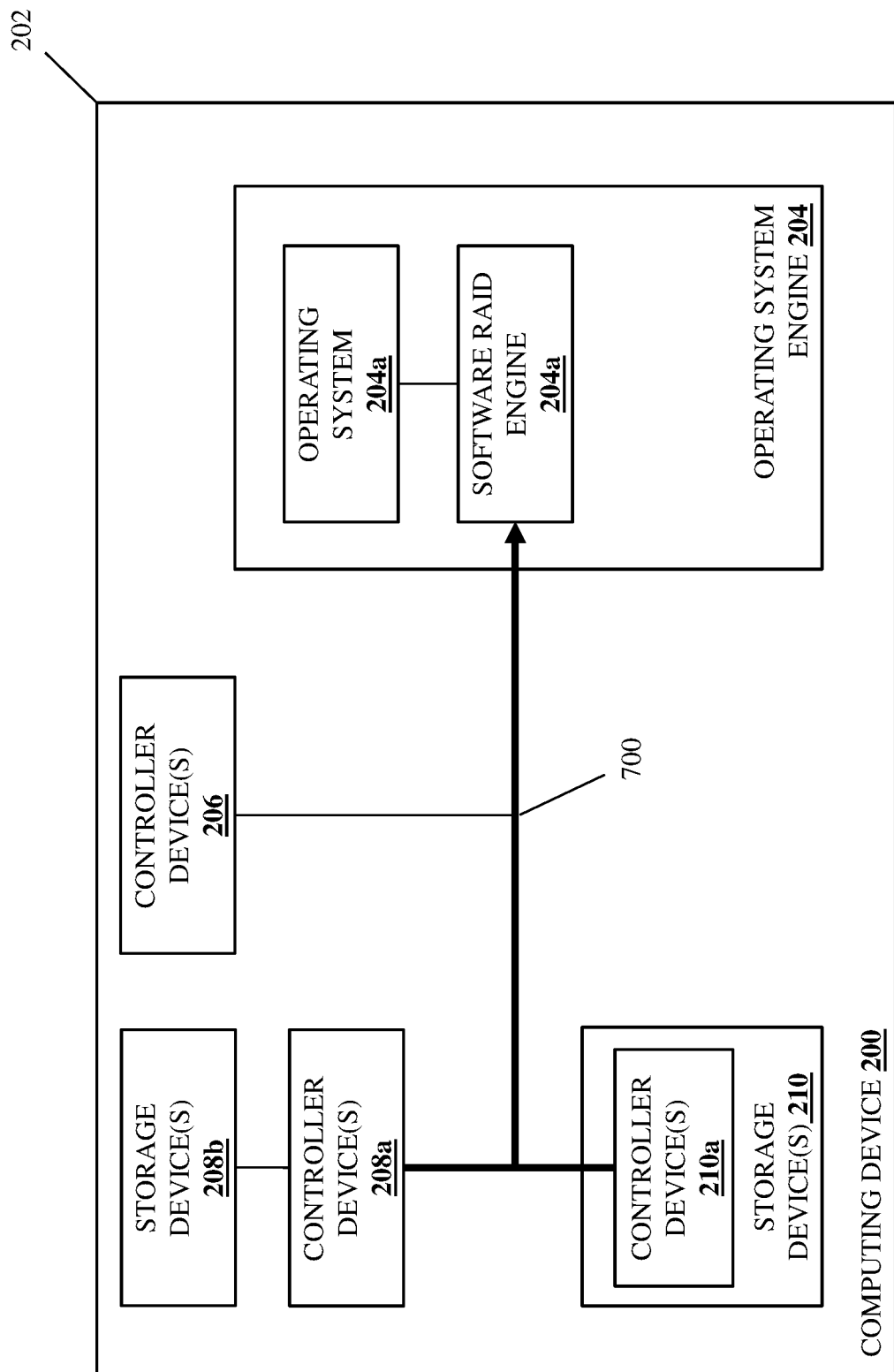
FIG. 7 is a schematic view illustrating an embodiment of the operation of the computing device of FIG. 2 during the method of FIG. 3.

If, at decision block 308, it is determined that there are no additional controller devices supported by the software RAID subsystem to register, the method 300 proceeds to block 310 where the software RAID subsystem creates one or more logical storage subsystems in the logical storage device. In an embodiment, at block 310 and in response to determining that there are no additional controller devices to register with the operating system 204b, the software RAID engine 204a in the computing device 200 may perform logical storage subsystem creation operations that may include creating one or more logical storage subsystems in the logical storage device provided by the storage devices 208b and 210. For example, with reference to FIG. 7, in some embodiments the logical storage subsystem creation operations may include the software RAID engine 204a performing metadata retrieval operations 700 that may include retrieving metadata from the controller devices 208a and 210a coupled to each of the storage devices 208b and 210 that are being used to provide the logical storage device.

As will be appreciated by one of skill in the art in possession of the present disclosure, the metadata retrieved from the controller devices 208a and 210a coupled to each of the storage devices 208b and 210 may identify one or more logical storage subsystems (e.g., virtual disks, RAID volumes, RAID Logical Unit Numbers (LUNs), and/or logical storage subsystems known in the art) that will be provided by each of the storage devices 208b and 210, as well as any other information that one of skill in the art in possession of the present disclosure would recognize as providing for the creation of the logical storage subsystems in the logical storage device. As such, at block 310, the logical storage subsystem creation operations performed by the software RAID engine 204a may include using the metadata retrieved from the controller devices 208a and 210a coupled to each of the storage devices 208b and 210 to "build", generate, and/or otherwise create one or more logical storage subsystems (e.g., virtual disks, RAID volumes, RAID LUNs, and/or logical storage subsystems known in the art) in the logical storage device that is provided by the storage devices 208b and 210. However, while a specific example of the creation of logical storage subsystem(s) in a logical storage device has been described, one of skill in the art in possession of the present disclosure will appreciate how the logical storage subsystems may be created in the logical storage device using a variety of techniques that will fall within the scope of the present disclosure as well.

Figure 8:
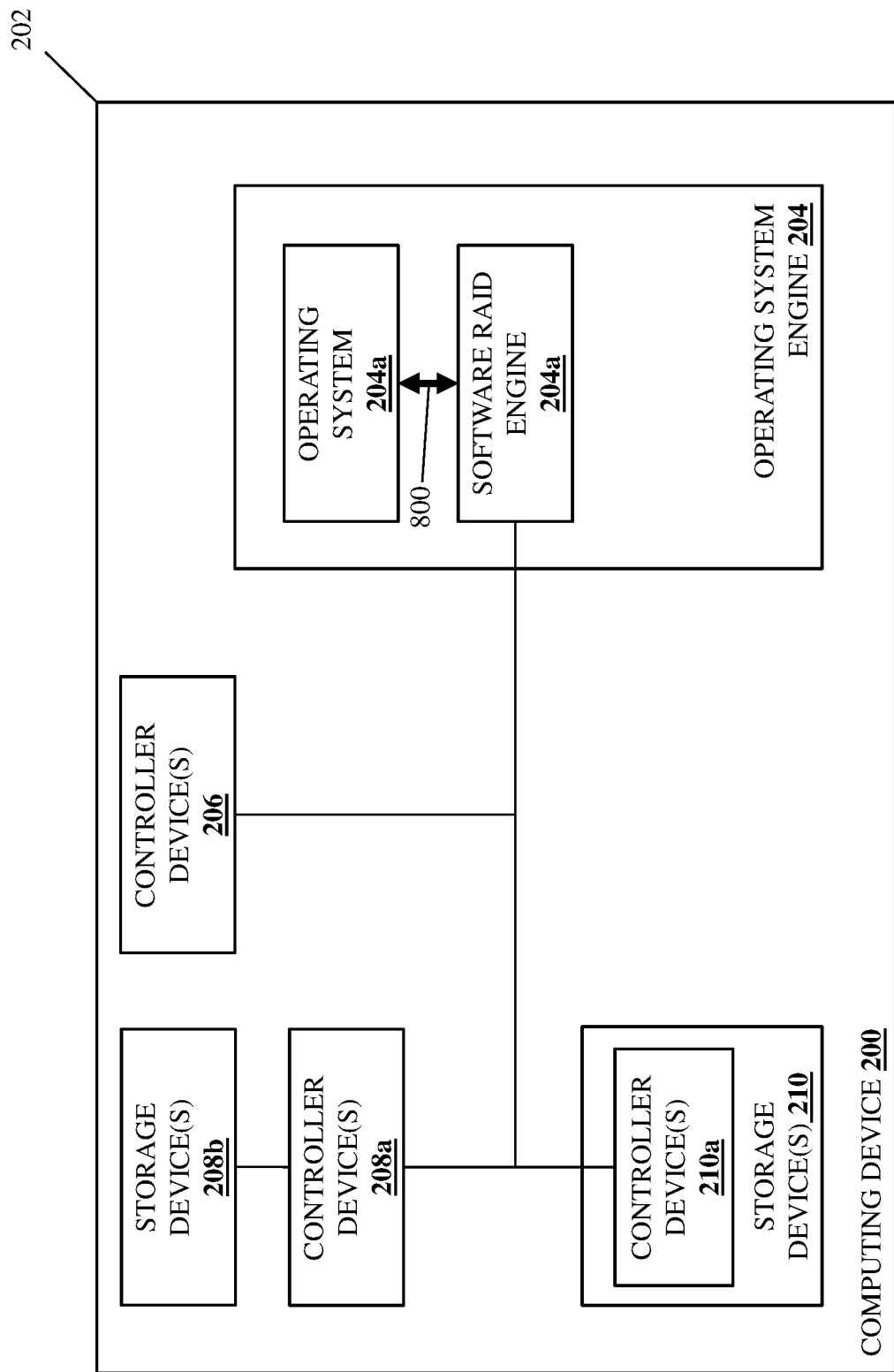
FIG. 8 is a schematic view illustrating an embodiment of the operation of the computing device of FIG. 2 during the method of FIG. 3.

The method 300 then proceeds to block 312 where the software RAID subsystem configures command communications with the operating system. With reference to FIG. 8, in an embodiment of block 312, the software RAID engine 204a in the computing device 200 may perform command communication configuration operations 800 that may include identifying a primary controller device from the plurality of controller devices 206, 208a, and 210a. For example, the controller device 206, 208a, or 210a identified as the primary controller device at block 312 may be a PCIe controller device that may have been designated by a computing device manufacturer to operate as the primary controller device based on that PCIe controller device being common to a variety of different configurations of computing devices provided by the computing device manufacturer (and thus being present in each of those computing devices/computing device configurations if needed to implement the direct-attached storage device software RAID system of the present disclosure). In another example, the controller device 206, 208a, or 210a identified as the primary controller device at block 312 may be a PCIe controller device that is not configured to be "hot removed" from the computing device 200. However, while a few specific examples of controller devices that may be identified as primary controller devices have been described, one of skill in the art in possession of the present disclosure will appreciate how any of a variety of criteria may be used to designate the controller device that may be identified as the primary controller device at block 312 while remaining within the scope of the present disclosure as well.

Following the command configuration operations at block 312, the direct-attached storage device software RAID system completes initialization such that the RAID volume provided by the logical storage device is configured for use, and one of skill in the art in possession of the present disclosure will appreciate how a full RAID volume or partial RAID volume may be configured via the method 300 as described above, and may be used for runtime data, during boot/initialization, and/or for other RAID volume uses that would be apparent to one of skill in the art in possession of the present disclosure.

Figure 9:
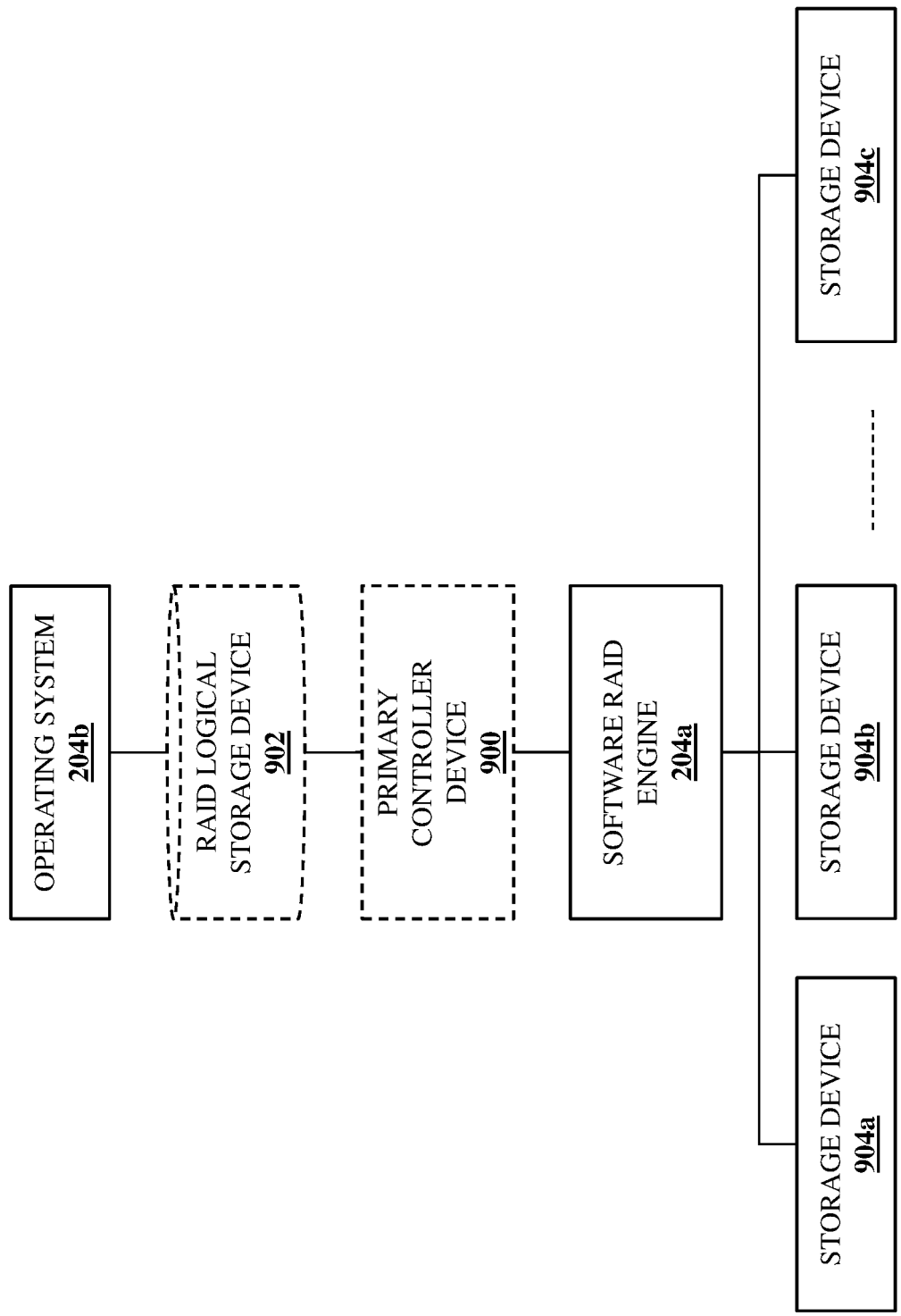
FIG. 9 is a schematic view illustrating an embodiment of the operation of the computing device of FIG. 2 during the method of FIG. 3.

The method 300 then proceeds to block 314 where the software RAID subsystem presents one of the controller devices to the operating system as a primary controller device that is connected to the logical storage device. With reference to FIG. 9, in an embodiment of block 314 and following the completion of the initialization of the direct-attached storage device software RAID system, the software RAID engine 204a may present, to the operating system 204b in the computing device 200, a primary controller device 900 (which as discussed above is provided by one of the controller devices 206, 208a, or 210a) as being connected to a RAID logical storage device 902 that is provided using a plurality of physical storage devices 904a, 904b, and up to 904c (which may be any of the storage devices 208a and 210 registered with the operating system 204b as discussed above).

To provide a specific example, one of the controller device(s) 206 that is not connected to a storage device may be presented to the operating system 204b as being connected to the RAID logical storage device 902, although one of skill in the art in possession of the present disclosure will appreciate how any one of the controller devices 208a or 210a may be presented to the operating system 204b as being connected to the RAID logical storage device 902 while remaining within the scope of the present disclosure as well. As will be appreciated by one of skill in the art in possession of the present disclosure, any of the controller devices 206, 208a, and 210a that are not presented to the operating system 204b as being connected to the RAID logical storage device 902 may instead be presented to the operating system 204b as secondary controller devices that are not connected to the RAID logical storage device 902 or any of the storage devices 904a-904c (i.e., despite at least some of those controller devices being physically connected to those storage devices 904a-904c).

As such, each of the logical storage subsystems (e.g., virtual disks, RAID volumes, RAID LUNs, and/or logical storage subsystems known in the art) provided by the RAID logical storage device 902 are exposed to the operating system 204b via the primary controller device 900. Thus, using some of the specific examples discussed above, each of the logical storage subsystems (e.g., virtual disks, RAID volumes, RAID LUNs, and/or logical storage subsystems known in the art) provided by storage devices 904a-904b may be presented to a user of the operating system provided by the operating system engine 204 as SCSI storage devices or otherwise being provided by SCSI storage devices.

Figure 10:
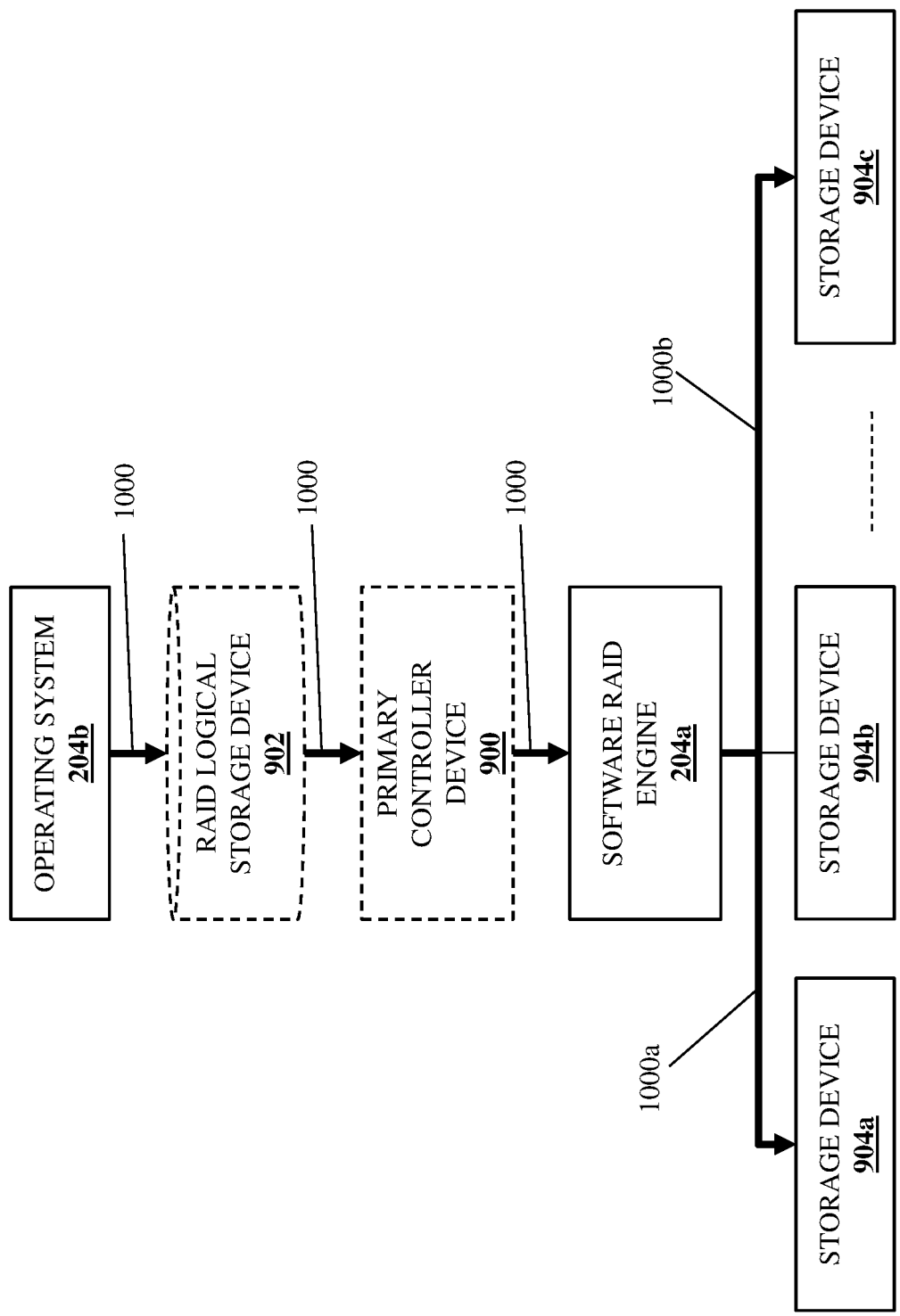
FIG. 10 is a schematic view illustrating an embodiment of the operation of the computing device of FIG. 2 during the method of FIG. 3.

The method 300 then proceeds to block 316 where the software RAID subsystem receives a command from the operating system that is directed to a primary controller device and that identifies a logical storage subsystem. With reference to FIG. 10, in an embodiment of block 316, the operating system 204b in the computing device 200 may perform command provisioning operations 1000 that include generating a command that identifies a logical storage subsystem provided by the RAID logical storage device 902, and transmitting that command to the primary controller device 900 that is presented as being connected to the RAID logical storage device 902, which one of skill in the art in possession of the present disclosure will appreciate will result that in that command being received by the software RAID engine 204a in the computing device 200. In an embodiment, the command transmitted by the operating system 204b to the software RAID engine 204a may include I/O commands such as a read command, a write command, and/or any other RAID commands that would be apparent to one of skill in the art in possession of the present disclosure.

Using the specific example provided above in which the software RAID engine 204a is provided by a SCSI-based driver, any commands received at block 316 by the software RAID engine 204a from the operating system 204b may be SCSI commands. Furthermore, as discussed in some of the specific examples above, the commands received at block 316 by the software RAID engine 204a from the operating system 204b may be mapped to protocol queues in the operating system 204b that are used to communicate with the software RAID engine 204a provided by the SCSI-based driver, and thus the software RAID engine 206a may receive those commands via the accessing of those protocols queues.

The method 300 then proceeds to block 318 where the software RAID subsystem transmits the command to a subset of physical storage devices that provide the logical storage subsystem via respective controller device(s) that couple the software RAID subsystem to that subset of physical storage devices. With continued reference to FIG. 10, in an embodiment of block 318, the software RAID engine 204a may perform command transmission operations 1000a and 1000b that, in the specific example illustrated in FIG. 10, includes transmitting the command received at block 316 to the storage device 904a and the storage device 904c via their respective controller device(s) (e.g., any of the controller device(s) 208a and 210a) based on those storage devices 904a and 904c providing the logical storage subsystem identified in the command received by the software RAID engine 204a from the operating system 204b. As will be appreciated by one of skill in the art in possession of the present disclosure, the commands 1000a and 1000b transmitted to the storage devices 904a and 904c may be provided by modified versions of the command 1000 received from the operating system 204b (e.g., SCSI commands received from the operating system 204b may be translated to a protocol supported by the controller device/storage device to which it is transmitted).

For example, in response to receiving the command from the operating system 204b in the computing device 200, the software RAID engine 204a in the computing device 200 may determine which of the storage devices 904a-904c provide the logical storage subsystem identified in that command (e.g., the storage devices 904a and 904c in this specific example). As discussed above, in some specific examples, protocol queues in the operating system 204b may be mapped to SAS, SATA, and/or NVMe protocol queues in the software RAID engine 204a, and thus the software RAID engine 204a may provide any commands received from the operating system 204b in the protocol queues associated with the protocol utilized by the storage devices that provide the logical storage subsystem to which those commands are directed. As such, the command received by the software RAID engine 204a from the operating system 204b may be placed in a protocol queue associated with the protocol used by the storage device 904a, as well as in a protocol queue associated with the protocol used by the storage device 904c.

In embodiments in which the software RAID engine 204a is provided by a SCSI-based driver and the commands received from the operating system 204b are SCSI commands, in the event the storage devices 904a and/or 904c are SAS storage devices or otherwise use the SAS protocol, SCSI commands may be placed in a SAS protocol queue in the software RAID engine 204a and then transmitted to the storage devices 904a and/or 904c via their respective controller device(s) (e.g., any of the controller device(s) 208a and 210a). However, in the event the storage devices 904a and/or 904c are SATA storage devices or otherwise use the SATA protocol, SCSI commands may be placed in a SATA protocol queue in the software RAID engine 204a, translated using a SCSI translation layer in the software RAID engine 204a (e.g., a SCSI-to-Frame Information Structure (FIS) translation), and then transmitted to the storage devices 904a and/or 904c via their respective controller device(s) (e.g., any of the controller device(s) 208a and 210a). Similarly, in the event the storage devices 904a and/or 904c are NVMe storage devices or otherwise use the NVMe protocol, SCSI commands may be placed in an NVMe protocol queue in the software RAID engine 204a, translated using a SCSI translation layer in the software RAID engine 204a (e.g., a SCSI-to-NVMe translation), and then transmitted to the storage devices 904a and/or 904c via their respective controller device(s) (e.g., any of the controller device(s) 208a and 210a).

However, while a few specific examples of the translation of commands received from the operating system 204b before providing them to the storage devices 904a-904c via their respective controller devices have been described, one of skill in the art in possession of the present disclosure will appreciate that other command translations may be performed while remaining within the scope of the present disclosure as well. For example, one of skill in the art in possession of the present disclosure will appreciate how a PCIe controller device connected to a SAS controller device will operate as a SAS controller that utilizes the SAS protocol, and thus no command translations may be needed in such situations. Similarly, a PCIe controller device connected to a SATA controller device will operate as a SATA controller that utilizes the SATA protocol, and thus SCSI-to-FIS translations may be needed in such situations.

The method 300 then returns to block 316. As such, the method 300 may loop such that the software RAID engine 204a in the computing device 200 receives commands from the operating system 204b in the computing device 200 and transmits those commands to the storage devices 904a-904c via their respective controllers as long as the storage devices 904a-904c are being used to provide the RAID logical storage device 902 to the operating system 204b. While not described in detail herein, in the event the storage devices 904a-904c will no longer be used to provide the RAID logical storage device 902 to the operating system 204b, the software RAID engine 204a may disconnect the controller device(s) 206, 208a, and 210a from the operating system 204b, as well as perform any other operations that would be apparent to one of skill in the art in possession of the present disclosure.

Thus, systems and methods have been described that provide for the presentation by a SCSI-based software RAID driver to an operating system of a single, primary PCIe controller device as being connected to a RAID logical storage device provided by a plurality of SAS, SATA, and/or NVMe physical storage devices, with the SCSI-based software RAID driver receiving I/O commands from the operating system that are directed to the primary PCIe controller device and that identify a RAID logical storage subsystem that is included in the RAID logical storage device, and transmitting those commands to a subset of the SAS, SATA, and/or NVMe physical storage devices that provide that RAID logical storage subsystem via respective PCIe controller device(s) that couple the SCSI-based software RAID driver to that subset of SAS, SATA, and/or NVMe physical storage devices. As such, software RAID support in operating systems like the WINDOWS® operating system discussed above is enabled in direct-attached storage device configurations for any types of storage devices and any types of CPUs, thus allowing the creation of a RAID using any available storage devices in a variety of computing devices. As such, RAID systems may be configured from a larger variety of storage devices and using spanned PCIe controllers, addressing several issues with the conventional RAID systems discussed above.

In specific examples, the software RAID subsystem described above may expose the logical storage device(s)

(e.g., virtual disks) to the operating system as logical storage subsystems (e.g., LUNs) that are accessible via a native physical controller device that cannot be "hot-removed" from the computing device (e.g., native physical controller devices like the AHCI controller device or the VMD hardware in a CPU described above). Continuing with the example of the Storport/miniport model used in the WINDOWS® operating system described above, miniport drivers may be provided for controller devices coupled to storage devices that provide the logical storage subsystems, and may be used to report those logical storage subsystems, with physical controller devices (e.g., SATA controller devices, NVMe controller devices, and/or other controller devices for storage devices that are physically present in the computing device) using physical miniport drivers, and virtual controller devices (e.g., NVMe-OF controller devices, "storage spaces" controller devices, and/or other controller devices for storage devices that are either not physically present in the computing device or that are virtualized from storage devices that are physically present in the computing device) using virtual miniport drivers.

However, in computing devices that do not include the native physical controller device discussed above, non-native controller devices available for presentation as being connected to the logical storage subsystems may be restricted to hot-removeable controller devices such as NVMe controller devices in NVMe storage devices, and in the event such controller devices are hot-removed from the computing device the direct-attached storage device software RAID system will become unavailable. As discussed in further detail below, a virtual miniport driver (and virtual adapter device) may be designated as the primary controller device discussed above in order to expose the logical storage subsystems in the logical storage device(s) to the operating system and remedy the issues associated with possible hot-removal of NVMe storage devices/NVMe controller devices providing the primary controller device, but the WINDOWS® operating system does not allow both physical miniport drivers and virtual miniport drivers to be provided in the same binary. Furthermore, the use of two different binaries to provide the physical miniport drivers and the virtual miniport drivers discussed above will present issues with regard to any communications between a physical miniport driver and a virtual miniport driver, as the standard method for communication between drivers in the WINDOWS® operating system is via Input/Output (IO) Request Packets (IRPs), while drivers in the Storport/miniport model utilize Storage Request Blocks (SRBs) for their communications.

Figure 11:
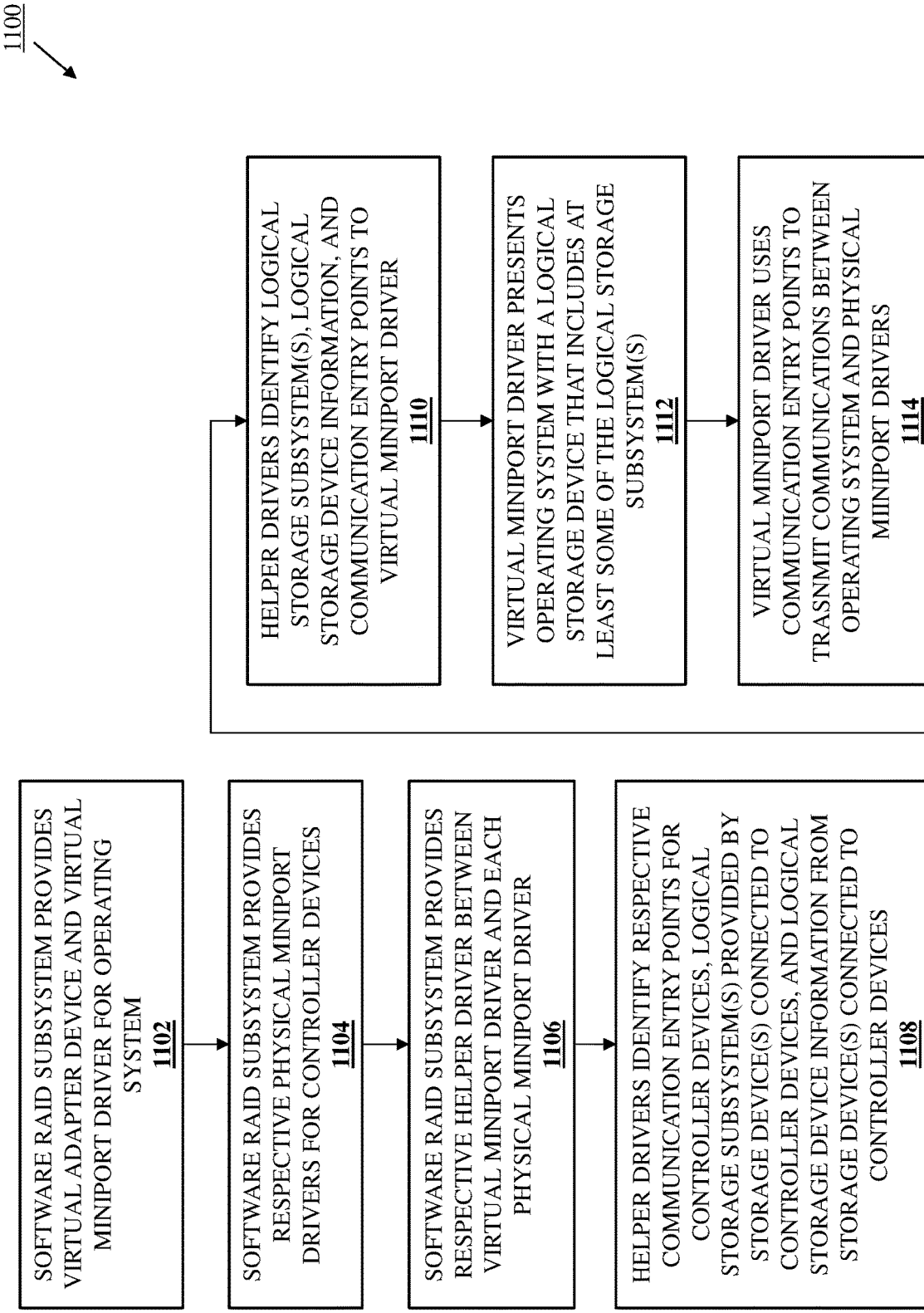
FIG. 11 is a flow chart illustrating an embodiment of a method for enabling control communications in a direct-attached storage device software RAID.

With reference to FIG. 11, an embodiment of a method 1100 for enabling control communications in a direct-attached storage device software RAID is illustrated. As discussed below, the systems and methods of the present disclosure provide a respective helper driver between a virtual miniport driver that exposes logical storage subsystem(s) to an operating system via a primary controller device provided by a virtual adapter device, and each physical miniport driver provided for a physical controller device/storage device that provides the logical storage subsystem(s), in order to facilitate communications that enable control of a software RAID that utilizes the logical storage subsystem(s). For example, the direct-attach storage device software RAID communication control system of the present disclosure may include a chassis housing a software RAID subsystem coupled to an operating system and a controller device. The software RAID subsystem provides a virtual adapter device and a virtual miniport driver for the operating system, provides a physical miniport driver for the controller device, and provides a helper driver between the virtual miniport driver and the physical miniport driver. The helper driver identifies, via the physical miniport driver, a communication entry point for the controller device and logical storage subsystem(s) provided by storage device(s) connected to the controller device, and provides them to the virtual miniport driver. The virtual miniport driver then presents a logical storage device to the operating system that includes at least some of the logical storage subsystem(s), and uses the communication entry point to transmit communications between the operating system and the physical miniport driver. As such, control communications in a software RAID in computing devices without a native controller device is enabled.

Figure 12:
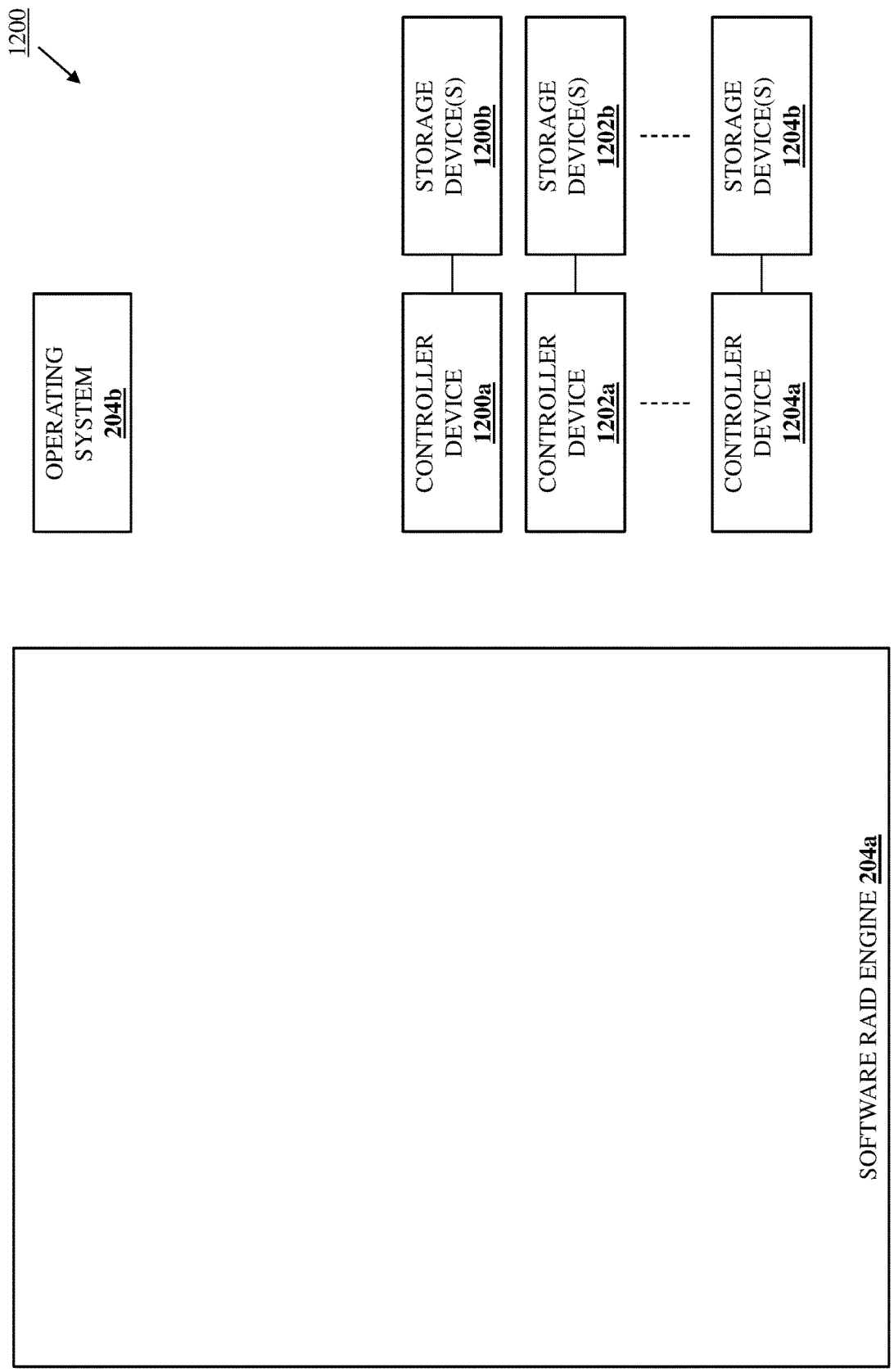
FIG. 12 is a schematic view illustrating an embodiment of the computing device of FIG. 2 that is used to describe the method of FIG. 11.

With reference to FIG. 12, an embodiment of a computing device 1200 is illustrated that may be provided by the computing device 200 of FIG. 2 and is used below to describe the method of FIG. 11. As such, the computing device 1200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 1200 discussed below may be provided by other devices that are configured to operate similarly as the computing device 1200 discussed below. In the illustrated embodiment, the computing device 1200 includes the software RAID engine 204*a* and the operating system 204*b* described above.

Furthermore, the computing device 1200 also includes a controller device 1200*a* that is coupled to one or more storage devices 1200*b*, a controller device 1202*a* that is coupled to one or more storage devices 1202*b*, and up to a controller device 1204*a* that is coupled to one or more storage devices 1204*b*, and one of skill in the art in possession of the present disclosure will appreciate how any of those controller device/storage device combinations may be provided by the controller device(s) 208*a* and storage device(s) 208*b*, and/or the controller device(s) 210*b* and storage device(s) 210 discussed above. However, while a specific computing device 1200 has been described, one of skill in the art in possession of the present disclosure will appreciate how the computing device 1200 may include other components and/or component configurations for providing conventional computing device functionality, as well as the direct-attached storage device software RAID control communication functionality described below, while remaining within the scope of the present disclosure as well.

Figure 13:
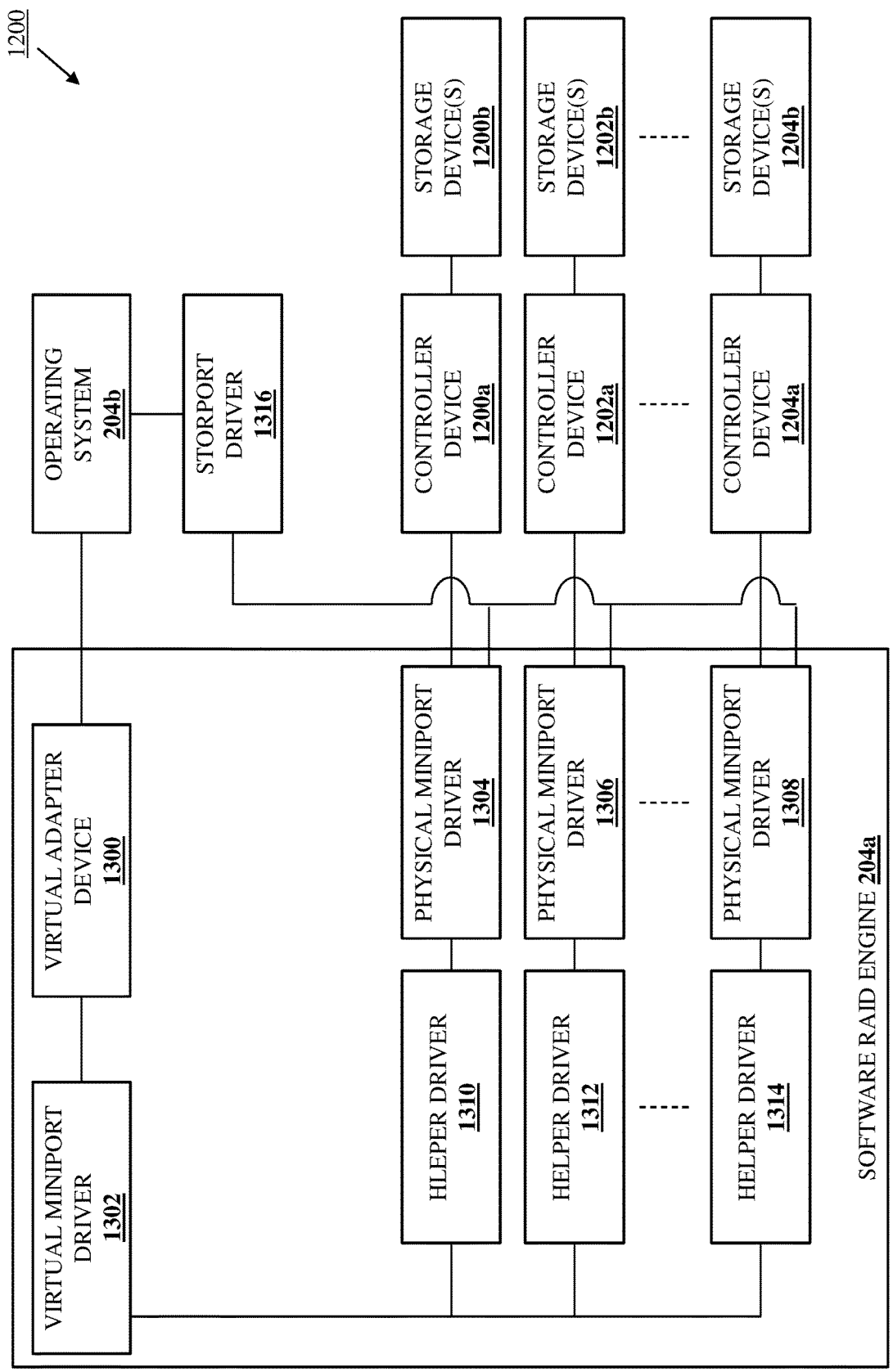
FIG. 13 is a schematic view illustrating an embodiment of the operation of the computing device of FIG. 12 during the method of FIG. 11.

The method 1100 begins at block 1102 where a software RAID subsystem provides a virtual adapter device and a virtual miniport driver for an operating system. With reference to FIG. 13, in an embodiment of block 1102, the software RAID engine 204*a* may perform virtual adapter device/virtual miniport driver provisioning operations that include generating and/or otherwise providing a virtual adapter device 1300 that is coupled to the operating system 204*b*, and generating and/or otherwise providing a virtual miniport driver 1302 that is coupled to the virtual adapter device 1300 and that may be provided by the virtual miniport driver discussed above. For example, the virtual adapter device 1300 may be generated by the software RAID engine 204*a* using a processing system and memory system in the computing device 1200 (e.g., using the processing system and memory system that provide the software RAID engine 204a and/or the operating system 204b) by, for example, providing instructions on that memory system that, when executed by the processing system, cause the processing system to provide the virtual adapter device 1300 that is configured to operate as the primary controller device described herein in order to expose the logical storage device(s)/logical storage subsystem(s) to the operating system 204b as described below, as well as perform any of the other functionality described below.

Similarly, the virtual miniport driver 1302 may be provided for the virtual adapter device 1300 by the software RAID engine 204a using a processing system and memory system in the computing device 1200 (e.g., using the processing system and memory system that provide the software RAID engine 204a and/or the operating system 204b) by, for example, providing instructions on that memory system that, when executed by the processing system, cause the processing system to provide the virtual miniport driver 1302 for the virtual adapter device 1300. However, while a specific virtual subsystem for exposing logical storage device(s)/logical storage subsystem(s) to the operating system 204b have been described, one of skill in the art in possession of the present disclosure will appreciate how other virtual subsystems may be used to expose logical storage device(s)/logical storage subsystem(s) to the operating system 204b similarly as described below while remaining within the scope of the present disclosure as well.

The method 1100 then proceeds to block 1104 where the software RAID subsystem provides respective physical miniport drivers for a plurality of controller devices. With continued reference to FIG. 13, in an embodiment of block 1104, the software RAID engine 204a may perform physical miniport driver provisioning operations that include generating and/or otherwise providing a respective physical miniport driver 1304, 1306, and up to 1308 for each of the controller devices 1200a, 1200b, and up to 1200c, respectively, with any of those physical miniport drivers provided by one of the physical miniport drivers discussed above. For example, the physical miniport drivers 1304-1308 may be provided by the software RAID engine 204a on their respective controller devices 1200a-1204a, and thus while the physical miniport drivers 1304-1308 are illustrated as being included "in" the software RAID engine 204a, one of skill in the art in possession of the present disclosure will appreciate how those physical miniport drivers 1304-1308 may be provided using hardware in the controller devices 1200a-1204a while remaining within the scope of the present disclosure as well. However, while specific physical subsystems for communicating with the controller devices 1304-1308 have been described, one of skill in the art in possession of the present disclosure will appreciate how other physical subsystems may be used to communicate with the controller devices 1304-1308 similarly as described below while remaining within the scope of the present disclosure as well.

The method 1100 then proceeds to block 1106 where the software RAID subsystem provides a respective helper driver between the virtual miniport driver and each physical miniport driver. With continued reference to FIG. 13, in an embodiment of block 1106, the software RAID engine 204a may perform helper driver provisioning operations that include generating and/or otherwise providing helper drivers 1310, 1312, and up to 1314 that are each coupled to a respective one of the physical miniport drivers 1304-1308, and that are all coupled to the virtual miniport driver 1302. In a specific example, the software RAID engine 204a may be configured to create a respective "helper driver request" device for each of the physical miniport drivers 1304-1308 that may each include an identifier (e.g., "SCSI/Helper-Driver") that causes the operating system 204b to load the respective helper driver between the virtual miniport driver 1302 and that physical miniport driver.

In an embodiment, each of the helper drivers 1310-1314 may be provided by the operating system 204b on the respective controller device that provides the physical miniport driver for which that helper driver was provided, and thus while the helper drivers 1310-1314 are illustrated as being included "in" the software RAID engine 204a, one of skill in the art in possession of the present disclosure will appreciate how those helper drivers 1310-1314 may be provided using hardware in the controller devices 1200a-1204a while remaining within the scope of the present disclosure as well. In a specific example, any or all of the helper drivers 1310-1314 may be provided by "generic" WINDOWS® drivers, although one of skill in the art in possession of the present disclosure will appreciate how other types of drivers may be used to provide the helper drivers 1310-1314 while remaining within the scope of the present disclosure as well. As such, while specific techniques for providing the helper drivers of the present disclosure have been described, one of skill in the art in possession of the present disclosure will appreciate how the helper drivers of the present disclosure may be provided using other techniques that will fall within the scope of the present disclosure as well.

Figure 14:
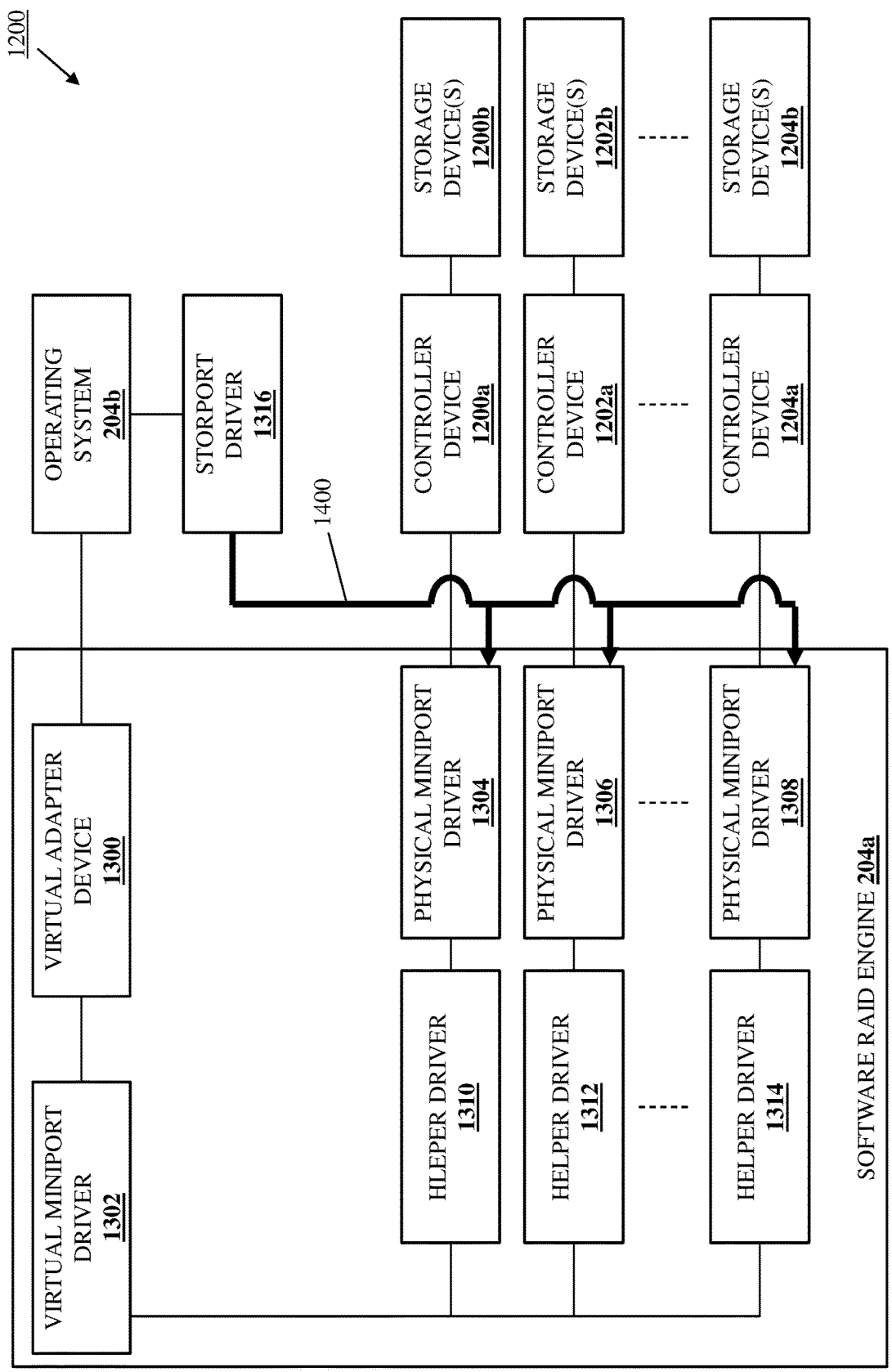
FIG. 14 is a schematic view illustrating an embodiment of the operation of the computing device of FIG. 12 during the method of FIG. 11.

As illustrated in FIG. 13, the operating system 204b may also generate or otherwise provide a storport driver 1316 that is coupled to each of the physical miniport drivers 1304-1308. For example, the storport driver 1316 may be provided by the operating system 204b using a processing system and memory system in the computing device 1200 (e.g., using the processing system and memory system that provide the software RAID engine 204a and/or the operating system 204b) by, for example, providing instructions on that memory system that, when executed by the processing system, cause the processing system to provide the storport driver 1316. As will be appreciated by one of skill in the art in possession of the present disclosure, the storport driver 1316 may be configured to perform conventional storport driver functionality such as the physical miniport driver communication operations 1400 illustrated in FIG. 14 that may include transmitting communications to each of the physical miniport drivers 1310-1314. In a specific example, the communications transmitted by the storport driver 1316 to each of the physical miniport drivers 1310-1314 may include a LUN reporting command (e.g., a "SCSIOP_REPORT_LUN" command), and as discussed below each of the physical miniport drivers 1310-1314 may be configured to ignore that "SCIOP_REPORT_LUN" command when it is received from the storport driver 1316 provided by the operating system 204b.

Figure 15A:
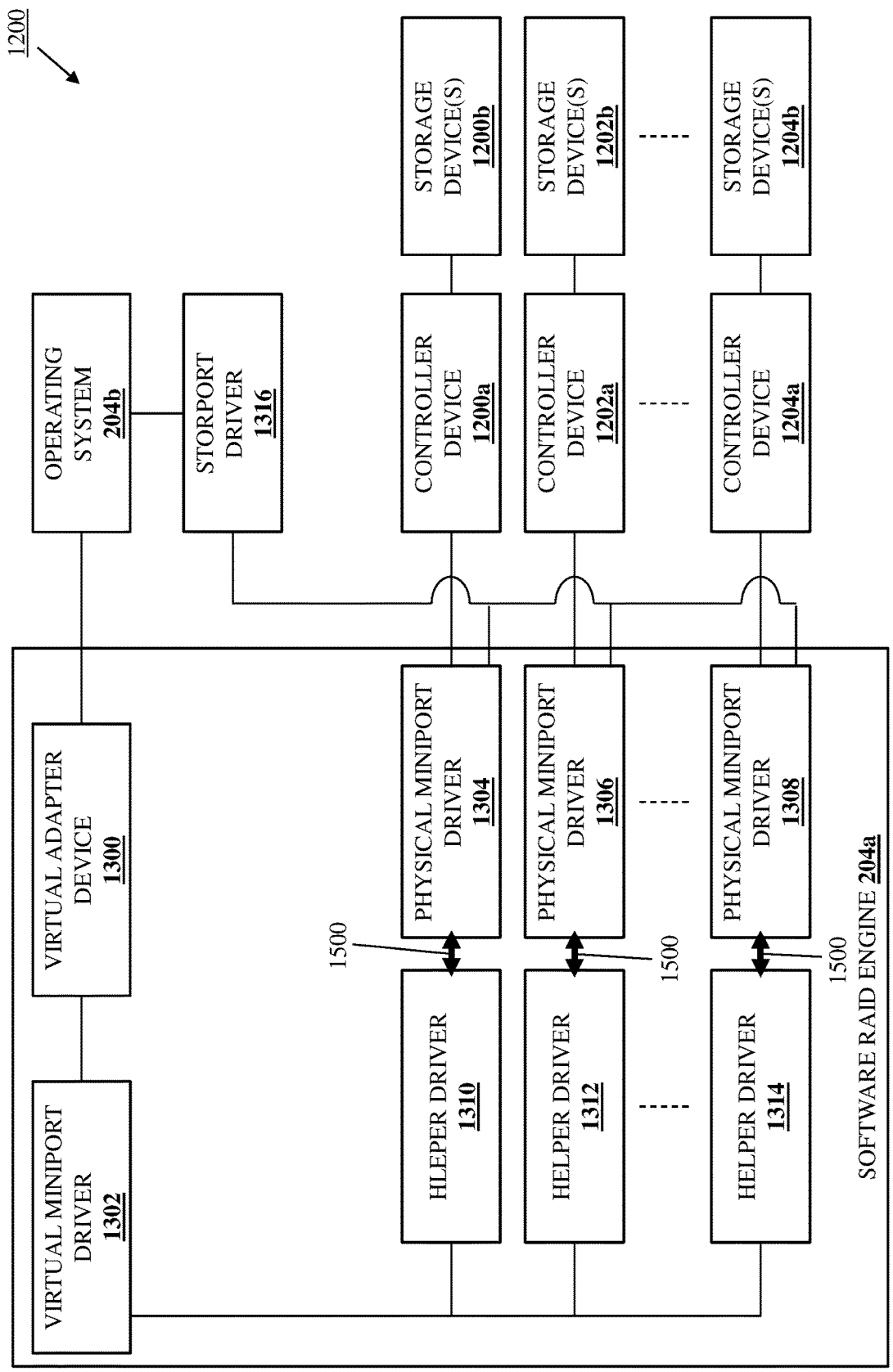
FIG. 15A is a schematic view illustrating an embodiment of the operation of the computing device of FIG. 12 during the method of FIG. 11.

The method 1100 then proceeds to block 1108 where the helper drivers identify respective communication entry points for the controller devices, at least one logical storage subsystem provided by at least one storage device connected to the controller devices, and logical storage device information from the at least one storage device connected to the controller devices. With reference to FIG. 15A, in an embodiment of block 1108, each of the helper drivers 1310-1314 may perform logical storage subsystem reporting request operations 1500 with their respective physical miniport drivers 1304-1308 that may include each helper driver requesting that the physical miniport driver coupled to that helper driver report logical storage subsystem(s) provided by the storage device(s) coupled to the controller device for which that physical miniport driver was provided and, in response, each physical miniport driver may determine the logical storage subsystem(s) provided by the storage device(s) coupled to the controller device for which that physical miniport driver was provided, and identify those logical storage subsystem(s) to its respective helper driver.

For example, the logical storage subsystem reporting request operations 1500 may include each of the helper drivers 1310-1314 generating a LUN reporting command (e.g., a "SCSIOP_REPORT_LUN" command) that includes an indication that it was generated and transmitted by a helper driver (e.g., by providing a unique target identifier that is associated with the helper drivers 1310-1314), and transmitting that LUN reporting command to the physical miniport driver coupled to that helper driver, with the physical miniport drivers 1304-1308 configured to respond to LUN reporting commands that indicate they were transmitted by their respective helper drivers 1310-1314. As such, the physical miniport drivers 1304-1308 may be configured to ignore LUN reporting commands from the storport driver 1316 provided by the operating system 204*b* (e.g., as part of the physical miniport driver communication operations 1400 discussed above), while responding to LUN reporting commands provided by the helper drivers 1310-1314 (i.e., based on those LUN reporting commands from the helper drivers having a unique target identifier such as "TargetID=2"). As will be appreciated by one of skill in the art in possession of the present disclosure, the ignoring of the LUN reporting commands from the operating system 204*b* will operate to hide the physical storage devices 1200*b*-1204*b* from the operating system 204*b*.

Figure 15B:
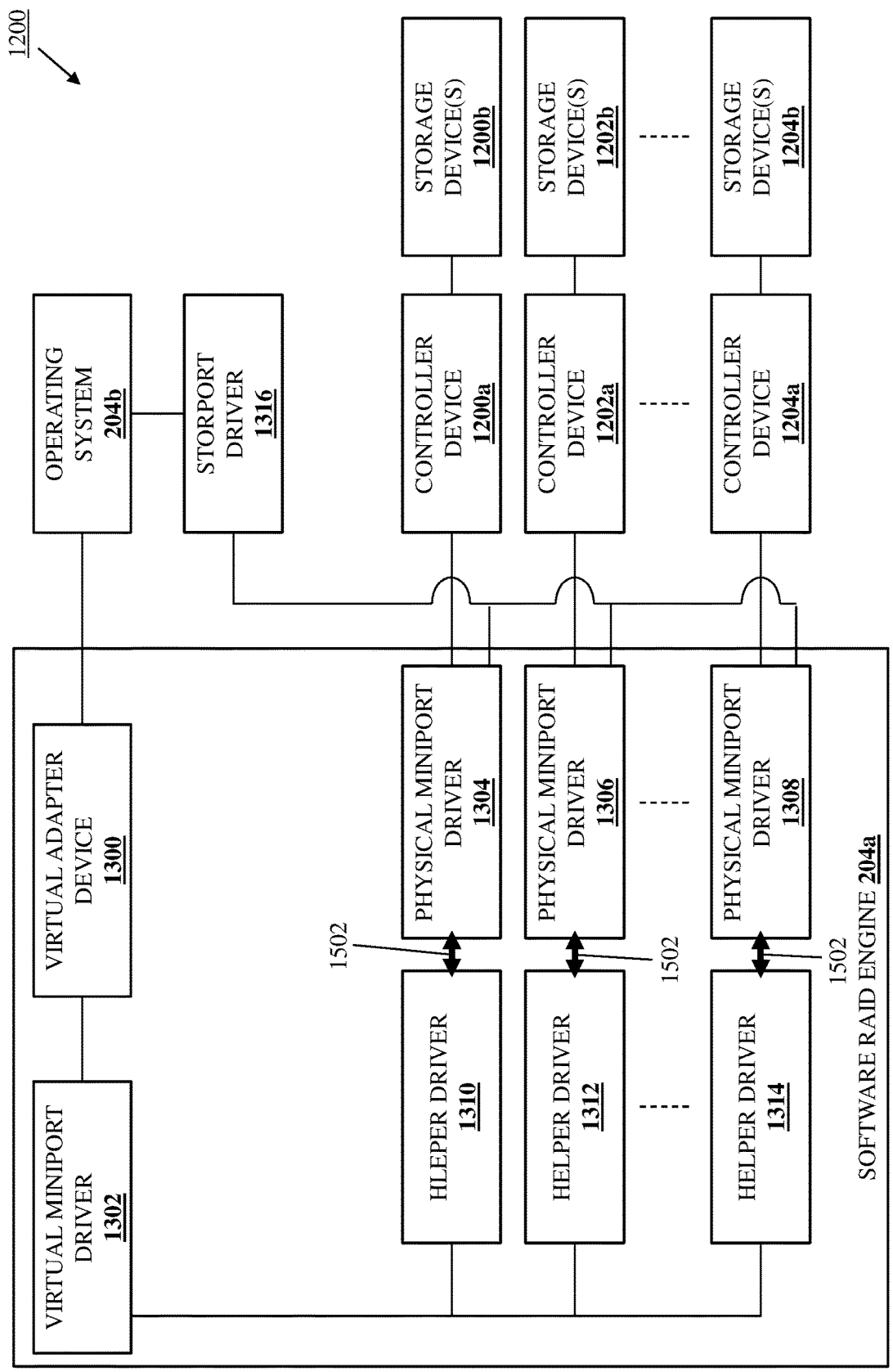
FIG. 15B is a schematic view illustrating an embodiment of the operation of the computing device of FIG. 12 during the method of FIG. 11.

With reference to FIG. 15B, in an embodiment of block 1108, any of the helper drivers 1310-1314 to which a logical storage subsystem was identified by its physical miniport driver may perform logical storage device information retrieval operations 1502 with that physical miniport driver that may include retrieving logical storage device information via that physical miniport driver. For example, the logical storage device information retrieval operations 1502 may include each helper driver 1310-1314 generating a custom Storage Request Block (SRB) communication (e.g., an "SRB_IO_CONTROL_READ_METADATA" communication), and transmitting that customer SRB communication to its physical miniport driver (that identified a logical storage subsystem). In response to receiving the custom SRB communication, each of the physical miniport drivers 1304-1308 may retrieve logical storage device provisioning metadata from the storage device(s) coupled to its controller device (e.g., metadata that describes a RAID that will be provided by those storage device(s)), and may provide that logical storage device provisioning metadata to its helper driver.

Thus, as part of block 1108, the physical miniport driver 1304 may provide to the helper driver 1310 any logical storage device provisioning metadata from the storage device(s) 1200*b* coupled to the controller device 1200*a*, the physical miniport driver 1306 may provide to the helper driver 1312 any logical storage device provisioning metadata from the storage device(s) 1202*b* coupled to the controller device 1202*a*, and up to the physical miniport driver 1308 may provide to the helper driver 1314 any logical storage device provisioning metadata from the storage device(s) 1204*b* coupled to the controller device 1204*a*. However, while the illustrated example includes each of the physical miniport drivers 1304-1308 providing logical storage device provisioning metadata from their storage devices to their helper drivers, one of skill in the art in possession of the present disclosure will appreciate how in some embodiments not all of the storage devices will include logical storage device provisioning metadata, and thus how some of the physical miniport drivers 1304-1306 may not provide logical storage device provisioning metadata to their helper driver while remaining within the scope of the present disclosure as well.

Figure 15C:
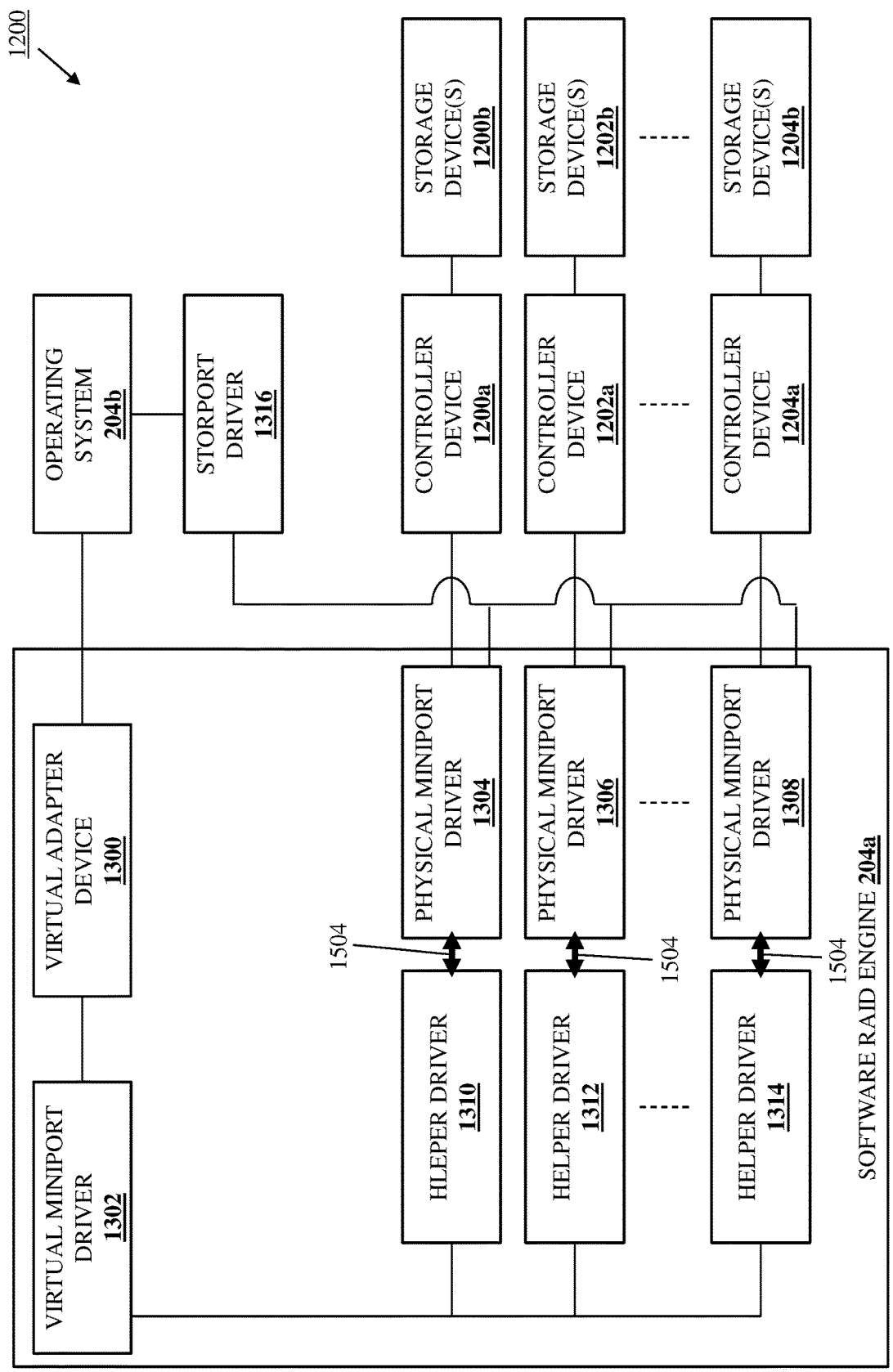
FIG. 15C is a schematic view illustrating an embodiment of the operation of the computing device of FIG. 12 during the method of FIG. 11.

With reference to FIG. 15C, in an embodiment of block 1108, any of the helper drivers 1310-1314 to which a logical storage subsystem was identified by its physical miniport driver may perform communication entry point retrieval operations 1504 with that physical miniport driver that may include retrieving a communication entry point from that physical miniport driver for its controller device. For example, the communication entry point retrieval operations 1504 may include each helper driver 1310-1314 requesting, and each physical miniport driver 1304-1308 providing it its helper driver, an Input/Output (IO) submission entry point for the controller device coupled to that physical miniport driver, and one of skill in the art in possession of the present disclosure will appreciate how such IO submission entry points may be used to enable the provisioning of IO submissions to that controller device.

Thus, as part of block 1108, the physical miniport driver 1304 may provide to the helper driver 1310 the IO submission entry point for the controller device 1200*a*, the physical miniport driver 1306 may provide to the helper driver 1312 the IO submission entry point for the controller device 1202*a*, and up to the physical miniport driver 1308 may provide to the helper driver 1314 the IO submission entry point for the controller device 1204*b*. However, while the illustrated example includes each of the physical miniport drivers 1304-1308 providing the IO submission entry points for their controller devices to their helper drivers, one of skill in the art in possession of the present disclosure will appreciate how in some embodiments not all of the physical miniport drivers 1304-1306 will provide the IO submission entry point for their controller device to their helper driver while remaining within the scope of the present disclosure as well. Furthermore, while the helper drivers 1310-1314 have been described as identifying respective communication entry points for the controller devices 1200*a*-1204*a*, at least one logical storage subsystem provided by the storage device(s) 1200*b*-1204*b* connected to the controller devices 1200*a*-1204*a*, and logical storage device information from the storage device(s) 1200*b*-1204*b* connected to the controller devices 1200*a*-1204*a*, one of skill in the art in possession of the present disclosure will appreciate how the helper drivers 1310-1314 may retrieve a variety of other information from the physical miniport drivers 1304-1308, the controller devices 1200*a*-1204*a*, and/or the storage devices 1200*b*-1204*b* while remaining within the scope of the present disclosure as well.

Figure 16:
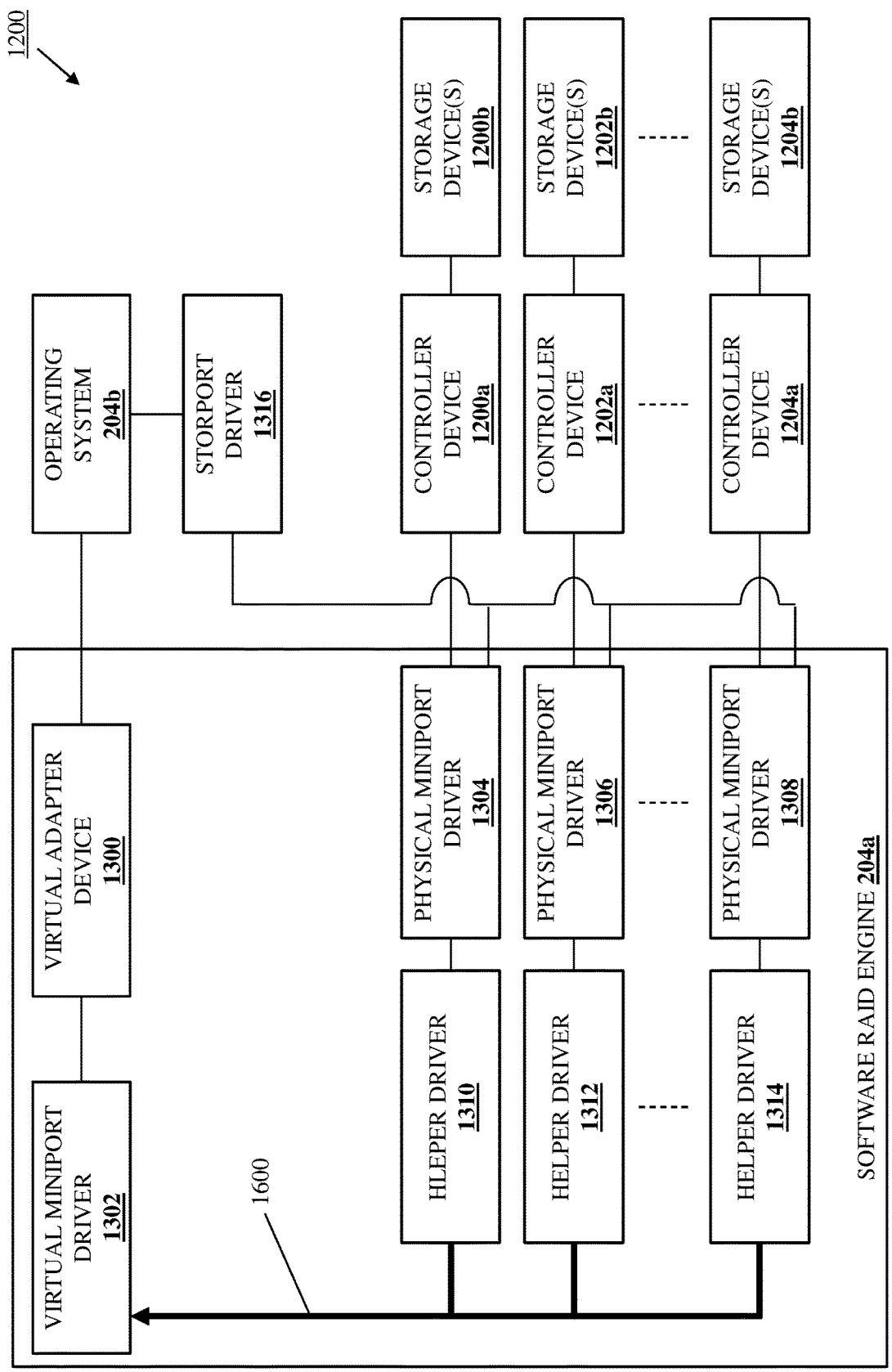
FIG. 16 is a schematic view illustrating an embodiment of the operation of the computing device of FIG. 12 during the method of FIG. 11.

The method 1100 then proceeds to block 1110 where the helper drivers identify the at least one logical storage subsystem, the logical storage device information, and the communication entry points to the virtual miniport driver. With reference to FIG. 16, in an embodiment of block 1110, the helper drivers 1310-1314 may perform logical storage subsystem/logical storage device information/communication entry point identification operations 1600 that may include identifying the logical storage subsystem(s), logical storage device information, and communication entry points to the virtual miniport driver 1302. For example, the logical storage subsystem/logical storage device information/communication entry point identification operations 1600 may include the helper drivers 1310-1314 generating a custom SRB communication (e.g., an "SRB_IO_CONTROL_CONFIG_DETAILS" communication) that includes the LUN(s), the logical storage device provisioning metadata, and IO submission entry point identified by that helper driver at block 1108, and transmitting that customer SRB communication to the virtual miniport driver 1302.

However, while the illustrated example includes each of the helper drivers 1310-1314 identifying logical storage subsystem(s), logical storage device information, and communication entry points to the virtual miniport driver 1302, one of skill in the art in possession of the present disclosure will appreciate how in some embodiments not all of the helper drivers 1310-1314 will provide logical storage subsystem(s), logical storage device information, and communication entry points to the virtual miniport driver 1302 while remaining within the scope of the present disclosure as well. Furthermore, one of skill in the art in possession of the present disclosure will appreciate how any of the helper drivers 1310-1314 may provide the virtual miniport driver with any other information retrieved by that helper driver at block 1108 while remaining within the scope of the present disclosure as well. As such, following block 1110, the virtual miniport driver 1302 may be informed of any LUNs provided by the storage devices 1200b-1204b, may receive any logical storage device provisioning metadata from those storage devices 1200b-1204b, and may receive IO submission entry points for the controller devices coupled to those storage devices 1200b-1204b.

Figure 17:
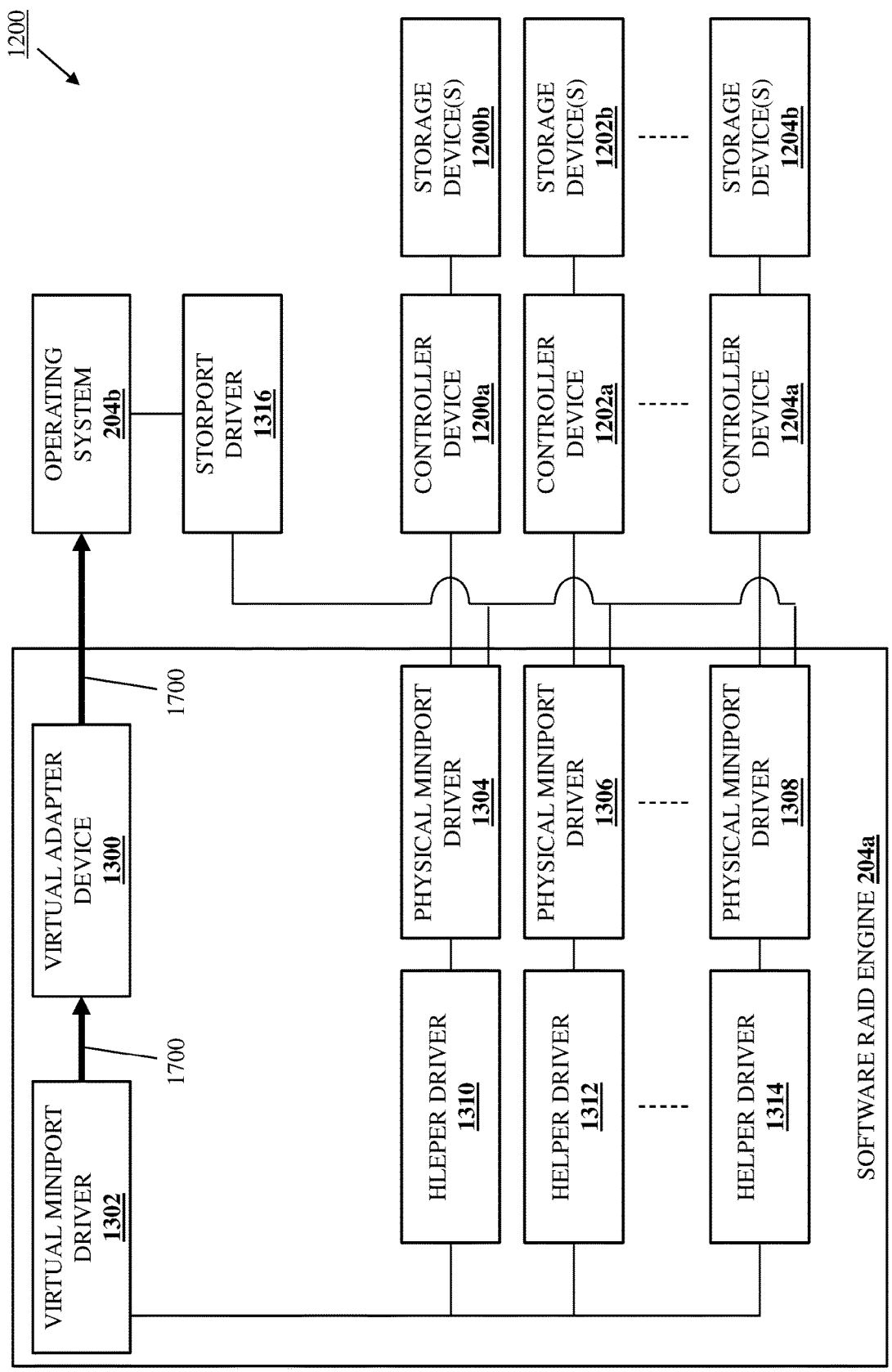
FIG. 17 is a schematic view illustrating an embodiment of the operation of the computing device of FIG. 12 during the method of FIG. 11.

The method 1100 then proceeds to block 1112 where the virtual miniport driver presents the operating system with a logical storage device that includes at least some of the at least one logical storage subsystem. In an embodiment, at block 1112, the virtual miniport driver 1302 may use the logical storage subsystems (e.g., the LUNs) and logical storage device information (e.g., the logical storage device provisioning metadata) identified to it at block 1110 to construct a logical storage device that includes at least some of the logical storage subsystems provided by the storage devices 1200b-1204b. As will be appreciated by one of skill in the art in possession of the present disclosure, the logical storage device constructed by the virtual miniport driver 1302 may include some combination of the logical storage subsystems (e.g., the LUNs) provided by the storage devices 1200b, 1202b, and/or 1204b and may be defined by the logical storage device information (e.g., the logical storage device provisioning metadata). As illustrated in FIG. 17, the virtual miniport driver 1302 may then perform logical storage device presentment operations 1700 that include presenting the logical storage device to the operating system 204b via the virtual adapter device 1300, and as described above with regard to the method 300 that logical storage device may be presented to the operating system 204b as being connected to the virtual adapter device 1300 that is designated a primary controller device.

Figure 18:
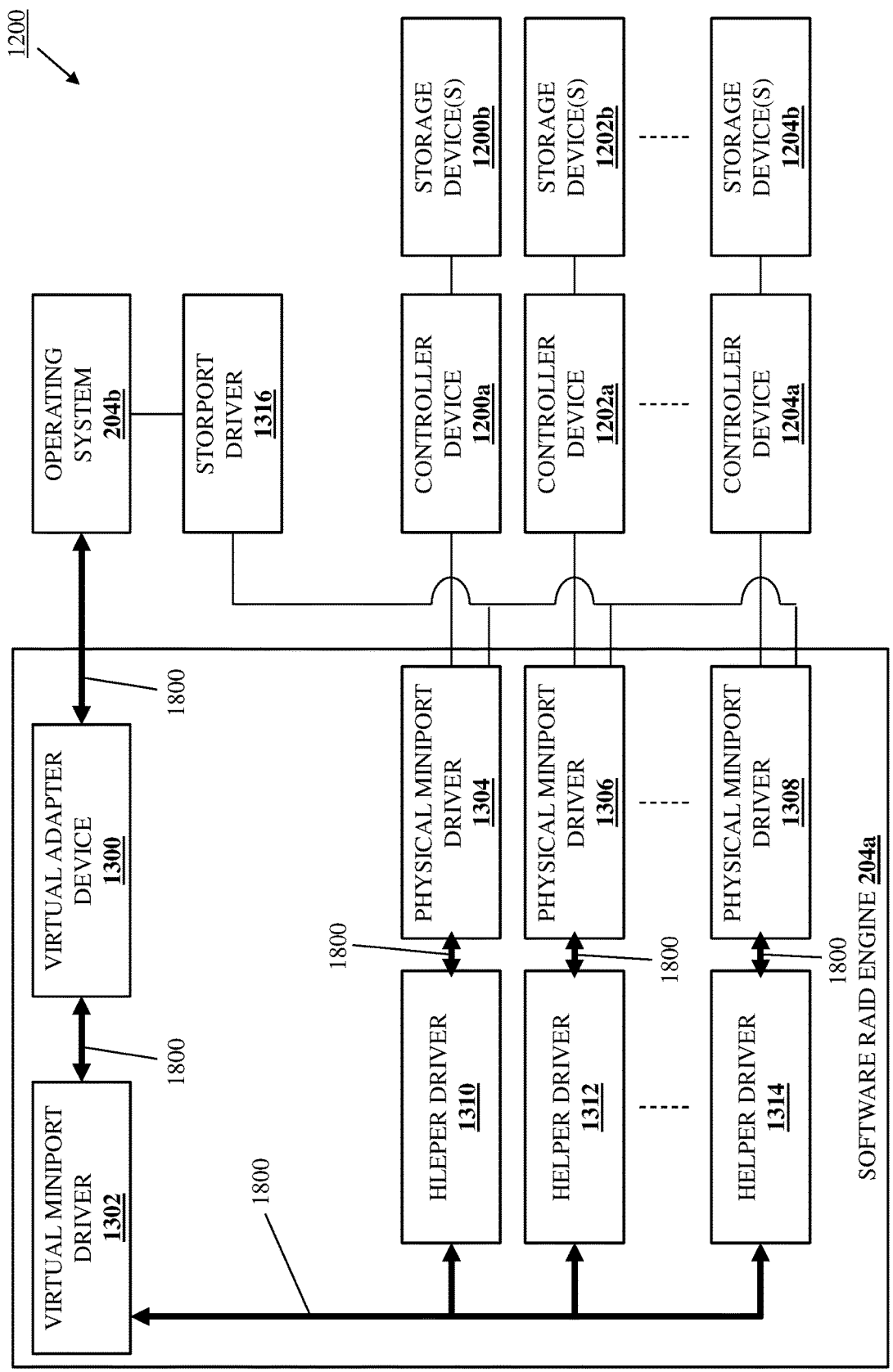
FIG. 18 is a schematic view illustrating an embodiment of the operation of the computing device of FIG. 12 during the method of FIG. 11.

The method 1100 then proceeds to block 1114 where the virtual miniport driver uses the communication entry points to transmit communications between the operating system and the physical miniport drivers. With reference to FIG. 18, in an embodiment of block 1114, the virtual miniport driver 1302 may perform communication transmission operations 1800 that include using the communication entry points identified to it at block 1108 to transmit communications between the operating system 204b and the physical miniport drivers 1304-1306. In a specific example, each of the helper drivers 1310-1314 may include separate dedicated functions to handle asynchronous communications from the virtual miniport driver 1302 and their respective physical miniport driver (i.e., communications between any helper driver and either of the virtual miniport driver 1302 and its physical miniport driver may be handled separately), and may pass a pointer to those functions to those miniport drivers using a custom SRB communication (e.g., a "SRB_IO_CONTROL_NOTIFICATION_FUNCTION" communication) and via an "Srb extension" member in order to enable the communication transmission between the operating system 204b and its respective physical miniport driver.

As will be appreciated by one of skill in the art in possession of the present disclosure, the operation of the computing device 1200 described above including the provisioning of the virtual miniport driver 1302, helper drivers 1310-1314, and physical miniport drivers 1304-1308 may be performed during runtime for the computing device 1200 (i.e., when the operating system 204b controls the computing device 1200). However, during non-runtime operations, the operation of the computing device 1200 may be modified. For example, at least some of the inventors of the present disclosure describe embodiments of the direct-attached storage device software RAID system of the present disclosure that operate during a crash dump mode for the computing device in U.S. patent application Ser. No. 18/228,006, filed Jul. 31, 2023, the disclosure of which is incorporated by reference herein in its entirety. As will be appreciated by one of skill in the art in possession of that patent document and the present disclosure, in response to a crash dump mode that is entered from runtime of the computing device 1200 in response to a crash of the computing device 1200, only the virtual miniport driver 1302 may be loaded, and that virtual miniport driver 1302 will then operate to directly initialize the controller devices 1200a-1204a that are needed to enable the crash dump operations using a custom SRB communication (e.g., a "SRB_FUNCTION_DUMP_POINTERS" communication).

Thus, systems and methods have been described that provide a respective helper driver between a virtual miniport driver that exposes logical storage subsystem(s) to an operating system via a primary controller device, and each physical miniport driver provided for a physical controller device/storage device that provides the logical storage subsystem(s), in order to facilitate communications that enable control of a software RAID that utilizes the logical storage subsystem(s). For example, the direct-attach storage device software RAID control communication system of the present disclosure may include a chassis housing a software RAID subsystem coupled to an operating system and a controller device. The software RAID subsystem provides a virtual adapter device and a virtual miniport driver for the operating system, provides a physical miniport driver for the controller device, and provides a helper driver between the virtual miniport driver and the physical miniport driver. The helper driver identifies, via the physical miniport driver, a communication entry point for the controller device and logical storage subsystem(s) provided by storage device(s) connected to the controller device, and provides them to the virtual miniport driver. The virtual miniport driver then presents a logical storage device to the operating system that includes at least some of the logical storage subsystem(s), and uses the communication entry point to transmit communications between the operating system and the physical miniport driver. As such, control communications in a software RAID in computing devices without a native controller device is enabled.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A direct-attached storage device software Redundant Array of Independent Disk (RAID) control communication system, comprising:
a chassis;
an operating system that is provided in the chassis;
a first controller device that is included in the chassis; and
a software Redundant Array of Independent Disk (RAID) subsystem that is included in the chassis, that is coupled to the operating system and the first controller device, and that is configured to:
provide a virtual adapter device and a virtual miniport driver for the operating system;
provide a first physical miniport driver for the first controller device; and
provide a first helper driver between the virtual miniport driver and the first physical miniport driver, where the first helper driver is configured to:
identify, via the first physical miniport driver, a first communication entry point for the first controller device and at least one first logical storage subsystem provided by at least one first storage device connected to the first controller device; and
identify the at least one first logical storage subsystem and the first communication entry point to the virtual miniport driver, wherein the virtual miniport driver is configured to:
present, to the operating system, a logical storage device that includes at least some of the at least one first logical storage subsystem; and
use the first communication entry point to transmit communications between the operating system and the first physical miniport driver.

2. The system of claim 1, wherein the first helper driver is configured to:
retrieve, via the first physical miniport driver, first logical storage device information from the at least one first storage device connected to the first controller device; and
provide the logical storage device using the first logical storage device information.

3. The system of claim 1, further comprising:
a second controller device that is included in the chassis and coupled to the software RAID subsystem, wherein the software RAID subsystem is configured to:
provide a second physical miniport driver for the second controller device; and
provide a second helper driver between the virtual miniport driver and the second physical miniport driver, where the second helper driver is configured to:
identify, via the second physical miniport driver, a second communication entry point for the second controller device and at least one second logical storage subsystem provided by at least one second storage device connected to the second controller device; and
identify the at least one second logical storage subsystem and the second communication entry point to the virtual miniport driver, wherein the virtual miniport driver is configured to:
present, to the operating system, the logical storage device that includes at least some of the at least one second logical storage subsystem; and
use the second communication entry point to transmit communications between the operating system and the second physical miniport driver.

4. The system of claim 3, wherein the second helper driver is configured to:
retrieve, via the second physical miniport driver, second logical storage device information from the at least one second storage device connected to the second controller device; and
provide the logical storage device using the second logical storage device information.

5. The system of claim 1, wherein the first physical miniport driver is configured to:
ignore operating system logical storage subsystem reporting requests received from the operating system; and
respond to first helper driver logical storage subsystem reporting requests received from the first helper driver.

6. The system of claim 1, wherein the first helper driver is configured to utilize Storage Request Block (SRB) communications with the first physical miniport driver to identify the first communication entry point for the first controller device and the at least one first logical storage subsystem provided by at least one first storage device connected to the first controller device.

7. The system of claim 1, wherein the first helper driver includes a first dedicated function for use in communicating with the virtual miniport driver, and a second dedicated function for use in communicating with the first physical miniport driver.

8. An Information Handling System (IHS), comprising:
a processing system; and
a memory system that is coupled to the processing system and that includes instructions that, when executed by the processing system, cause the processing system to provide a software Redundant Array of Independent Disk (RAID) engine that is configured to:
provide a virtual adapter device and a virtual miniport driver for an operating system that is coupled to the processing system;
provide a first physical miniport driver for a first controller device that is coupled to the processing system; and
provide a first helper driver between the virtual miniport driver and the first physical miniport driver, where the first helper driver is configured to:
identify, via the first physical miniport driver, a first communication entry point for the first controller device and at least one first logical storage subsystem provided by at least one first storage device connected to the first controller device; and
identify the at least one first logical storage subsystem and the first communication entry point to the virtual miniport driver, wherein the virtual miniport driver is configured to:

present, to the operating system, a logical storage device that includes at least some of the at least one first logical storage subsystem; and
use the first communication entry point to transmit communications between the operating system and the first physical miniport driver.

9. The IHS of claim 8, wherein the first helper driver is configured to:
retrieve, via the first physical miniport driver, first logical storage device information from the at least one first storage device connected to the first controller device; and
provide the logical storage device using the first logical storage device information.

10. The IHS of claim 8, wherein the software RAID subsystem is configured to:
provide a second physical miniport driver for a second controller device that is coupled to the processing system; and
provide a second helper driver between the virtual miniport driver and the second physical miniport driver, where the second helper driver is configured to:
identify, via the second physical miniport driver, a second communication entry point for the second controller device and at least one second logical storage subsystem provided by at least one second storage device connected to the second controller device; and
identify the at least one second logical storage subsystem and the second communication entry point to the virtual miniport driver, wherein the virtual miniport driver is configured to:
present, to the operating system, the logical storage device that includes at least some of the at least one second logical storage subsystem; and
use the second communication entry point to transmit communications between the operating system and the second physical miniport driver.

11. The IHS of claim 10, wherein the second helper driver is configured to:
retrieve, via the second physical miniport driver, second logical storage device information from the at least one second storage device connected to the second controller device; and
provide the logical storage device using the second logical storage device information.

12. The IHS of claim 8, wherein the first physical miniport driver is configured to:
ignore operating system logical storage subsystem reporting requests received from the operating system; and
respond to first helper driver logical storage subsystem reporting requests received from the first helper driver.

13. The IHS of claim 8, wherein the first helper driver is configured to utilize Storage Request Block (SRB) communications with the first physical miniport driver to identify the first communication entry point for the first controller device and the at least one first logical storage subsystem provided by at least one first storage device connected to the first controller device.

14. A method for enabling control communications in a direct-attached storage device software Redundant Array of Independent Disk (RAID), comprising:
providing, by a software Redundant Array of Independent Disk (RAID) subsystem, a virtual adapter device and a virtual miniport driver for an operating system;
providing, by the software RAID subsystem, a first physical miniport driver for a first controller device;
providing, by the software RAID subsystem, a first helper driver between the virtual miniport driver and the first physical miniport driver;
identifying, by the first helper driver via the first physical miniport driver, a first communication entry point for the first controller device and at least one first logical storage subsystem provided by at least one first storage device connected to the first controller device;
identifying, by the first helper driver, the at least one first logical storage subsystem and the first communication entry point to the virtual miniport driver;
presenting, by the virtual miniport driver to the operating system, a logical storage device that includes at least some of the at least one first logical storage subsystem; and
using, by the virtual miniport driver, the first communication entry point to transmit communications between the operating system and the first physical miniport driver.

15. The method of claim 14, further comprising:
retrieving, by the first helper driver via the first physical miniport driver, first logical storage device information from the at least one first storage device connected to the first controller device; and
providing, by the first helper driver, the logical storage device using the first logical storage device information.

16. The method of claim 15, further comprising:
providing, by the software RAID subsystem, a second physical miniport driver for a second controller device that is coupled to the processing system; and
providing, by the software RAID subsystem, a second helper driver between the virtual miniport driver and the second physical miniport driver;
identifying, by the second helper driver via the second physical miniport driver, a second communication entry point for the second controller device and at least one second logical storage subsystem provided by at least one second storage device connected to the second controller device;
identifying, by the second helper driver, the at least one second logical storage subsystem and the second communication entry point to the virtual miniport driver;
presenting, by the virtual miniport driver to the operating system, the logical storage device that includes at least some of the at least one second logical storage subsystem; and
using, by the virtual miniport driver, the second communication entry point to transmit communications between the operating system and the second physical miniport driver.

17. The method of claim 16, further comprising:
retrieving, by the second helper driver via the second physical miniport driver, second logical storage device information from the at least one second storage device connected to the second controller device; and
providing, by the second helper driver, the logical storage device using the second logical storage device information.

18. The method of claim 14, further comprising:
ignoring, by the first physical miniport driver, operating system logical storage subsystem reporting requests received from the operating system; and
responding, by the first physical miniport driver to first helper driver logical storage subsystem reporting requests received from the first helper driver.

19. The method of claim 14, further comprising:
utilizing, by the first helper driver, Storage Request Block (SRB) communications with the first physical miniport driver to identify the first communication entry point for the first controller device and the at least one first logical storage subsystem provided by at least one first storage device connected to the first controller device.

20. The method of claim 14, wherein the first helper driver includes a first dedicated function for use in communicating with the virtual miniport driver, and a second dedicated function for use in communicating with the first physical miniport driver.

* * * * *